(12) United States Patent
Cerniglia

(10) Patent No.: US 9,579,835 B2
(45) Date of Patent: Feb. 28, 2017

(54) LOCATING RING AND METHOD FOR POSITIONING PARTS

(71) Applicant: Anthony Cerniglia, Wauconda, IL (US)

(72) Inventor: Anthony Cerniglia, Wauconda, IL (US)

(*) Notice: Subject to any disclaimer, the term of this patent is extended or adjusted under 35 U.S.C. 154(b) by 0 days.

(21) Appl. No.: 14/974,754

(22) Filed: Dec. 18, 2015

(65) Prior Publication Data
US 2016/0101549 A1    Apr. 14, 2016

Related U.S. Application Data

(60) Division of application No. 14/085,225, filed on Nov. 20, 2013, now Pat. No. 9,221,203, which is a
(Continued)

(51) Int. Cl.
*B29C 45/17*    (2006.01)
*B29C 33/74*    (2006.01)
(Continued)

(52) U.S. Cl.
CPC ........... *B29C 45/1775* (2013.01); *B29C 33/74* (2013.01); *B29C 45/04* (2013.01); *B29C 45/1761* (2013.01);
(Continued)

(58) Field of Classification Search
CPC ............. B29C 45/2606; B29C 45/2602; B29C 33/303; B29C 33/304; B29C 2049/4856; B29C 45/844; B29C 45/1742; B29C 45/1744
See application file for complete search history.

(56) References Cited

U.S. PATENT DOCUMENTS

| 2,391,007 A | 12/1945 | Buckendale |
| 2,821,750 A | 2/1958 | Huelskamp |

(Continued)

FOREIGN PATENT DOCUMENTS

EP    2008788 A2    12/2008

OTHER PUBLICATIONS

Extended European Search Report, issued in related European Application No. 12788988.9, Mar. 20, 2015, EP.
(Continued)

*Primary Examiner* — Jason L Vaughan
(74) *Attorney, Agent, or Firm* — Lempia Summerfield Katz LLC

(57) ABSTRACT

A mold tool has a first mold part with a first side forming a first surface, a nozzle exposed on the first side of the first mold part, and a locating ring mounted to the first mold part. The ring has a body of a metal material and a guard of a material softer than the metal material. The body has a ring shape, a perimeter surface facing radially outward, a central opening concentric with a center axis, a mounting face, and a locating face opposite the mounting face. The guard is connected to the body radially within the perimeter surface and projects axially beyond the locating face. The locating ring surrounds and exposes the nozzle. The locating ring can be mounted to the first mold part. A second mold part can be arranged in proximity to the first mold part and have a locating hole in a second surface. The mold parts can be moved toward one another until the guard contacts the second surface or enters the locating hole. The mold parts can be repositioned relative to one another until the guard and the perimeter surface align with the locating hole and then can be moved further toward one another until the locating ring seats in the locating hole and the first and second surfaces engage one another.

20 Claims, 26 Drawing Sheets

Related U.S. Application Data continuation-in-part of application No. PCT/US2012/039086, filed on May 23, 2012.

(60) Provisional application No. 61/489,177, filed on May 23, 2011.

(51) Int. Cl.
 *B29C 45/04* (2006.01)
 *B29C 33/30* (2006.01)
 *F16B 19/02* (2006.01)

(52) U.S. Cl.
 CPC ......... *B29C 45/1781* (2013.01); *B29C 33/303* (2013.01); *B29C 45/1742* (2013.01); *B29C 45/1743* (2013.01); *B29C 2045/1776* (2013.01); *F16B 19/02* (2013.01); *Y10T 29/4973* (2015.01); *Y10T 29/49826* (2015.01); *Y10T 29/49895* (2015.01)

(56) References Cited

U.S. PATENT DOCUMENTS

| | | | |
|---|---|---|---|
| 3,049,759 A | | 8/1962 | Eberhardt |
| 3,202,033 A | | 8/1965 | Weidner, Jr. |
| 4,030,869 A | * | 6/1977 | Miller et al. ............ B29C 45/26 425/471 |
| 4,775,130 A | * | 10/1988 | Von Holdt .............. B29C 45/36 249/105 |
| 4,790,738 A | * | 12/1988 | Shimojo et al. ....... B29C 33/305 249/103 |
| 4,856,977 A | * | 8/1989 | Von Holdt .............. B29C 45/36 249/105 |
| 5,096,405 A | | 3/1992 | Pace et al. |
| 5,112,214 A | | 5/1992 | Glatt, Jr. |
| 5,688,537 A | * | 11/1997 | Brams et al. ........ B29C 45/1742 264/39 |
| 7,604,477 B2 | | 10/2009 | Glaesener |
| 7,790,070 B2 | | 9/2010 | Sekihara et al. |
| 2013/0302465 A1 | * | 11/2013 | Wang .................. B29C 45/2606 425/470 |

OTHER PUBLICATIONS

International Search Report and Written Opinion in PCT/US2012/039086, mailed Aug. 1, 2012.

\* cited by examiner

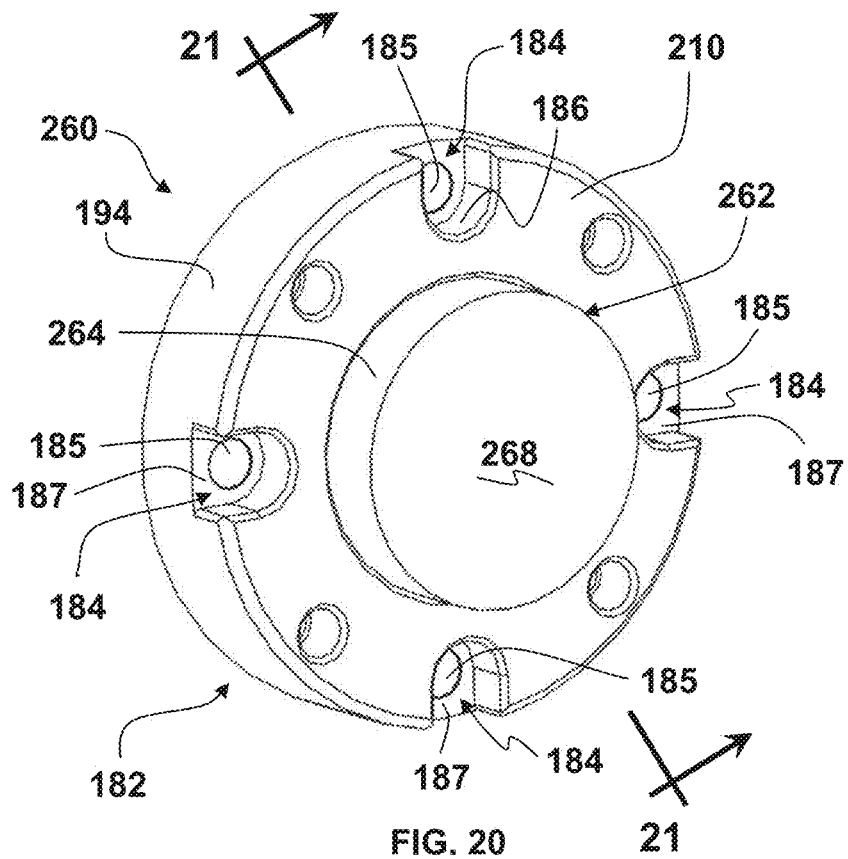
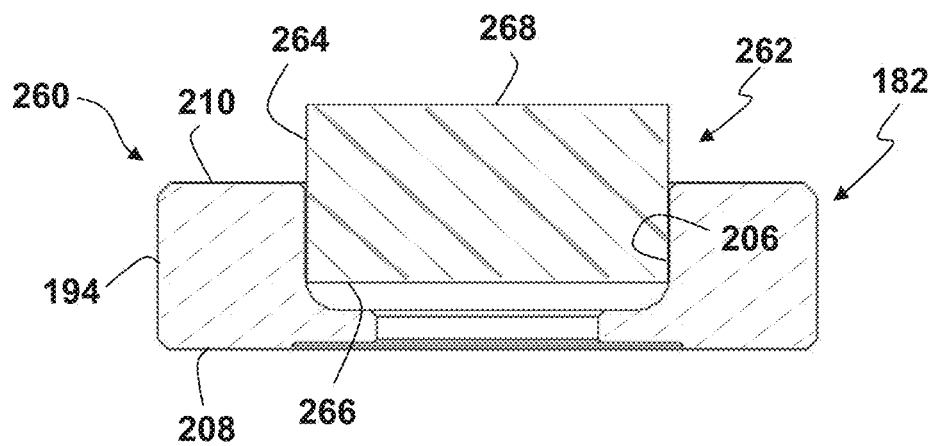
FIG. 20
FIG. 21

LOCATING RING AND METHOD FOR POSITIONING PARTS

RELATED APPLICATION DATA

This application claims priority benefit of, and is a divisional of U.S. application Ser. No. 14/085,225 filed on Nov. 20, 2013 and entitled "Locating Ring and Method for Positioning Parts", which is a continuation-in-part of, international application no. PCT/2012/0039086 filed on May 23, 2012 and entitled "Locating Ring and Method of Positioning Parts," which claimed priority benefit of U.S. Provisional Application Ser. No. 61/489,177 filed on May 23, 2011 and entitled "Locating Ring and Method for Positioning Parts." The entire content of each of these prior filed applications is hereby incorporated by reference herein.

BACKGROUND

1. Field of the Disclosure

The present invention is generally directed to positioning parts in manufacturing machines, equipment, tools, and the like, and more particularly to a locating ring and locating method for positioning such parts relative to one another.

2. Description of Related Art

It is well known in the injection molding industry that damage to the mold tools or platens can be very costly and have a significant negative impact on productivity of a molding operation. Substantial mold machine downtime occurs when a machine platen or mold surface must be repaired. Additionally, significant expense is incurred when necessary to repair the surfaces of a mold tool or platen. It is also well known in the industry that proper alignment of the mold tool is critical to correct operation of the machine and the molding process and also to prevent damage to the surfaces of the mold tool parts. Once mold tool parts are properly aligned, the parts are clamped in place together under significant load or pressure. Problems occur when mold tool parts are misaligned and the machine attempts to clamp the mold parts.

Positioning of a mold tool relative to a stationary platen is typically done manually by an operator. The operator attempts to guide the moving mold tool into engagement with the stationary machine platen. It is well known to provide a locating hole in one of the parts, such as the stationary machine platen, and to provide a locating ring on the other of the parts, typically the suspended mold tool. The locating ring and locating hole are used to properly position and align the mold tool and machine platen relative to one another. The operator typically guides the movable mold tool into close proximity with the stationary platen while attempting to align the locating ring with the locating hole. However, because the mold components are extremely heavy, bulky and quite large, the operator most times cannot see or adequately determine when proper alignment has occurred. An operator typically makes several failed attempts to align the locating ring and locating hole. Each attempt can, and often does, result in varying degrees of damage to the locating ring, machine platen, and locating hole.

If the locating ring is not properly aligned with the locating hole, the locating ring can become damaged, rendering it unsuitable for future use. If a damaged locating ring were used again instead of repairing or replacing the ring, damage to the locating hole can occur or the ring may not fit properly in the locating hole. The surfaces of the stationary platen can also become damaged by contact with a damaged locating ring. When such damage occurs, the mold or platen surface must be immediately repaired, which can be an extremely time-consuming and costly process. Reworking of the platen or mold can affect the strength and integrity of the structure. Reworking of the mold part surface can weaken the structure as well.

In addition to alignment of the mold tool and platen, flatness of the contact surfaces is critical. When mold tools are produced, great care is taken to insure that all components are manufactured with precise surfaces that are manufactured referencing an originating, extremely flat, planar surface. Injection mold tools are constructed in separable halves. Each half is then mounted to an opposing machine platen, one being stationary and the other moving. These platen faces are parallel when they are flat. Thus the mold tool and communicating surfaces interface precisely as they where manufactured. Locating ring contact with the stationary platen creates raised edges or areas around the impacted area. These raised areas will prevent the stationary mold half to mount flatly to the damaged platen surface. This creates a non-parallel relationship between the stationary and moveable mold halves. Because the moveable mold half is mounted flatly to the opposing moveable machine platen, the communicating surfaces from the separable mold halves will not interface as they were manufactured. Many of these surfaces interlock and have essentially no clearance between them. In other words, they are "fit" together. Any non parallel interfacing between these surfaces can and often will cause premature wear of the communicating surfaces, fracture and thus catastrophic damage of mold parts, and also time and raw material waste producing what are believed-to-be finished parts that ultimately do not specifically meet the product specifications. Any damage from locating ring contact must be repaired before the mold tool is clamped to prevent any or all of these detrimental conditions.

A typical locating ring is made of metal, such as steel. A steel locating ring is highly durable. However, use of the steel locating ring results in damage to the ring or the platen surface when setting up the mold in the molding machine, and particularly during the positioning process, as noted above. Others have attempted to solve or improve upon these problems by providing locating rings that are formed of non-metal materials. However, locating rings must be sized very precisely within extremely tight tolerances in order to accurately and adequately fit within a locating hole of a molding machine platen so that the parts are properly positioned before clamping them together. Non-metal locating rings are typically formed from materials that are inferior when it comes to achieving extremely tight tolerances and size. Also, locating rings formed of non-metal materials have proven to be unsuitable when it comes to durability. Such locating rings typically must be replaced much too often. Additionally, locating rings are subjected to a range of temperature environments. Two types of injection mold tools are commonly known as cold runner and hot runner. The non-metal rings are limited to use on cold runner mold tools. Hot runner mold tools, as the name implies, have a heated manifold located within the mold structure that maintains the resin at the desired processing temperature, which can be higher than 700 degrees Fahrenheit. As locating rings are directly fastened to the mold structure, a non-metal ring made of thermoplastic material will degrade and deform from continuous exposure to this thermal environment. The non-metal locating rings can even become easily damaged when the mold is stored and not being used, simply by coming into contact with other objects.

SUMMARY

In one example according to the teachings of the present invention, a locating ring is disclosed for positioning machine parts or tools relative to one another. The locating ring has a body formed of a metal material. The body has a ring shape with a perimeter surface facing radially outward, a center axis defined by the body, a mounting face, and a locating face spaced from and facing opposite the mounting face along the axis. A guard is connected to the body and is formed of a material that is softer than the metal material of the body. The guard is sized to be radially within the perimeter wall and to project axially beyond the locating face.

In one example, the guard can be formed of a non-metal material or a non-ferrous metal material.

In one example, the body can be formed of a steel material.

In one example, the guard can be formed of liquid silicone rubber, aluminum, bronze, brass, thermoplastic elastomer, thermoplastic rubber, thermoset elastomer, or thermoset rubber.

In one example, the body can have a plurality of through bores formed axially through the body. The guard can include a plurality of bumper segments, one bumper segment protruding through each of the through bores.

In one example, the guard can include a plurality of bumper segments protruding through one or more through bores in the body. Each of the bumper segments can have a back end aligned flush with the mounting face of the body and a front end protruding beyond the locating face of the body.

In one example, the guard can be bonded to the locating face of the body.

In one example, the locating face can have a recess thereon and the guard can be bonded to the locating face within the recess.

In one example, the locating can have an insert positioned against the locating face of the body. The guard can be formed of a translucent, semi-transparent, or transparent material covering the insert such that the insert is visible through the guard.

In one example, the locating ring can have an insert that carries indicia visible through the guard.

In one example, the body can have a central opening concentric with the axis defined by an inner annular wall of the body.

In one example, a skin layer of the guard material can be formed integral with the guard and cover one or more surfaces of the body, other than parts of the locating face, such as a surface of an inner annular wall surrounding a central opening in the body.

In one example, the guard or at least a skin layer of the guard can have a non-stick surface characteristic.

In one example, the guard can be removably connected to the body.

In one example, the guard can be magnetically connected to the body.

In one example, the guard can be a removable plug insertable into a central opening in the body.

In one example, the guard can be fastened to the body.

In one example according to the teachings of the present invention, a mold tool has a first mold part with a first side forming a first surface. A nozzle is exposed on the first side of the first mold part. A locating ring is mounted to the first mold part and has a body formed of a metal material and a guard formed of a material softer than the metal material of the body. The body has a ring shape, a perimeter surface facing radially outward, a central opening concentric with a center axis, a mounting face, and a locating face opposite the mounting face. The guard is connected to the body radially within the perimeter surface and projecting axially beyond the locating face. The locating ring surrounds and exposes the nozzle.

In one example, the foregoing and/or other below-mentioned alternate examples of the locating ring are applicable to the above-mentioned mold tool.

In one example, the nozzle can be exposed on the first surface of the first side of the first mold part. The mounting face of the locating ring can be mounted directly to the first surface.

In one example, the mold tool can further include an elongate valve gate body that protrudes from the first surface of the first mold part. The nozzle can be located at a free end of the valve gate body spaced from the first surface. The mounting face of the locating ring can be mounted to the free end of the valve gate body.

In one example according to the teachings of the present invention, a method is disclosed for aligning parts of a molding machine or other type of manufacturing equipment, tools, or the like. The method includes providing a locating ring having a metal body and a guard formed of a material softer than the metal of the body. The metal body has a ring shape, a perimeter surface facing radially outward, a center axis, a mounting face, and a locating face opposite the mounting face. The guard can be a non-removable part or a removable part and is connected to the body radially within the perimeter surface and projecting axially beyond the locating face. The locating ring is mounted to a first side of a first mold part or other part, which has a first surface being on the first side. A second mold part or other part and the first mold part or other part are arranged in proximity to one another. The second mold part or other part has a second surface with a locating hole therein. The first and second surfaces are moved toward one another until the guard contacts the second surface or enters the locating hole. The first and second mold parts or other parts are repositioned relative to one another as needed until the guard and the perimeter wall align with the locating hole. The first and second mold parts or other parts are further moved toward one another until the locating ring seats in the locating hole and the first and second surfaces engage one another.

In one example, the first mold part or other part is a movably suspended injection mold and the second mold part or other part is a stationary machine platen. The steps of moving and further moving can include moving the injection mold relative to the stationary machine platen.

In one example, the step of mounting can further include mounting the mounting face of the locating ring directly to the first surface of the first mold part.

In one example, the step of mounting can further include mounting the mounting face of the locating ring to a free end of a valve gate body protruding from the first surface.

In one example, the aforementioned and other below-mentioned features of the locating ring and/or the mold tool can be employed in the method of aligning parts.

In one example according to the teachings of the present invention, a method of retrofitting a locating ring with a guard is disclosed for positioning machine parts or tools relative to one another. The method includes identifying a locating ring to be retrofit. The locating ring has a body made of metal and the body includes a perimeter wall, a mounting face, and an opposite locating face. A guard is created and configured to connect to the body of the locating ring and is made of a material softer than the metal of the body. The guard is connected to the body so that part of the guard protrudes axially beyond the locating face and is radially within the perimeter wall.

In one example according to the teachings of the present invention, a guard is provided for retrofitting an existing locating ring. The guard has a means or mechanism to connect to and be retained on the locating ring. The guard is made of a material that is softer than that of the locating ring.

In one example, the methods can further include the step of removing a worn, damaged, or used guard from the locating ring. The steps of selecting can include selecting a new or replacement guard configured to connect to the body. The steps of connecting can include connecting the new or replacement guard to the body.

In one example, the aforementioned and/or other below mentioned features of the locating ring, mold tool, and alignment method can be employed in the method of retrofitting.

BRIEF DESCRIPTION OF THE DRAWINGS

Objects, features, and advantages of the present invention will become apparent upon reading the following description in conjunction with the drawing figures, in which:

FIG. 20 shows a perspective view of another example of a locating ring constructed in accordance with the teachings of the present invention.

FIG. 21 shows a cross-section taken along line 21-21 of the locating ring in FIG. 20.

DETAILED DESCRIPTION OF THE DISCLOSURE

A locating ring and a method of locating mold tools are disclosed and described herein. The disclosed locating ring and method solve or improve upon one or more of the above-noted and/or other problems and disadvantages with prior known locating rings and methods. In one example, a locating ring has a body formed of a metal material for achieving tight tolerance control, flatness against a mold surface, and durability. The disclosed locating ring also has a somewhat or relatively resilient guard protruding from one face of the body. The disclosed guard can be formed from a non-metal material, a non-ferrous material, or another suitable material and is positioned so as to come in contact with a mold part or other part during locating or positioning of the mold part or other part with another mold part or other part in a mold machine or other machine or equipment. Only when the locating ring is aligned with the locating hole in the other part will the metal portion of the body seat in the locating hole.

In one example according to the teachings of the present invention, a locating ring is disclosed for positioning machine parts or tools relative to one another. The locating ring has a body formed of a metal material.

In one example, a method of positioning mold parts involves utilizing such a locating ring on a mold tool or other part and then attempting to move two mold parts together and properly align them with one another. If not properly aligned, the guard portion of the locating ring will contact the surface of the other mold part around the locating hole until the locating ring and locating hole are properly aligned. Only then can the two mold parts be moved into engagement with one another and only then will the locating ring seat in the locating hole. The metal body of the locating ring can be precisely formed to closely fit within the locating hole to properly position the two mold parts relative to one another. The guard of the disclosed locating ring prevents damage caused by contact between the locating ring and surfaces of the other mold part when misaligned.

Figure 1:
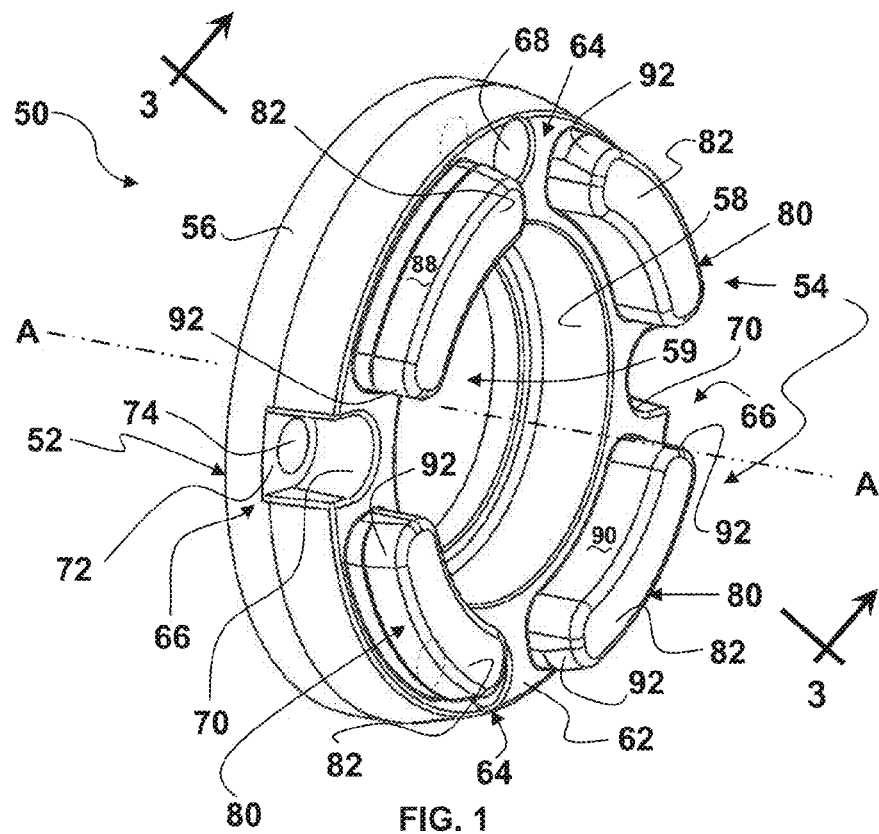
FIG. 1 shows a perspective view of one example of a locating ring constructed in accordance with the teachings of the present invention.
Figure 2:
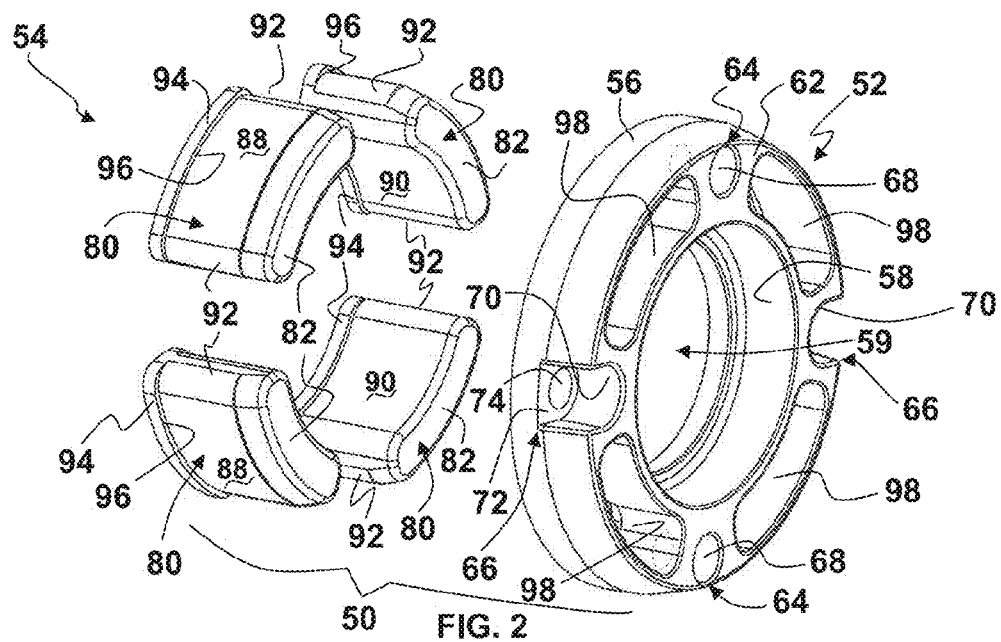
FIG. 2 shows an exploded perspective view of the locating ring in FIG. 1.
Figure 3:
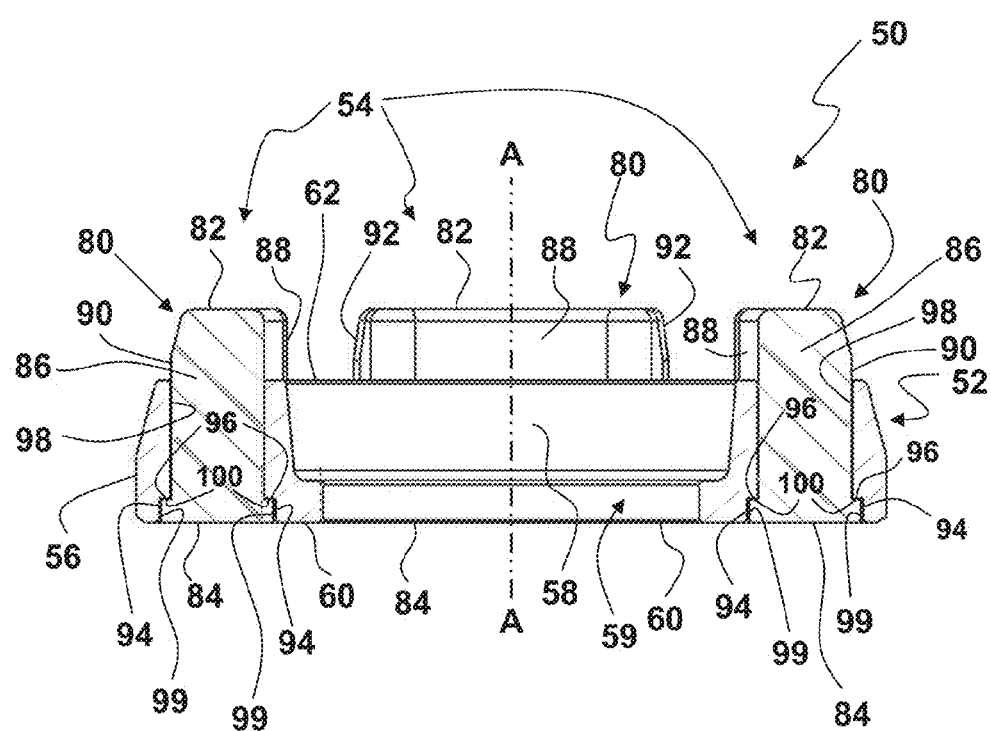
FIG. 3 shows a cross-section taken along line 3-3 of the locating ring in FIG. 1.

Turning now to the drawings, FIGS. 1-3 show one example of a locating ring 50 constructed in accordance with the teachings of the present invention. The locating ring 50 in this example generally has a body 52 and a guard 54 connected to the body. As disclosed herein, the guard 54 can take on numerous different configurations and constructions and can be connected to and retained on the body 52 in a variety of different ways. Similarly, the body 52 can also take on numerous different configurations and constructions and yet fall within the spirit and scope of the present invention.

In this example, the body 52 generally has an annular ring shape with the perimeter surface 56 that faces radially outward from a center axis A. The center axis A is located at the center of the ring shaped body 52. Though not specifically necessary, the body 52 in this example is a circular or cylindrical construction and in the form of an annulus that is concentric with the center axis A. It is possible that the body 52, and thus the locating ring 50, have a non-circular shape and yet function as intended. The body 52 could be oval, elliptical, polygonal, or the like.

The body 52 in this example also has an inner surface 58 that faces radially inward toward the center axis A. A central opening 59 is defined within the inner surface 58. The body shape is generally defined between the inner surface 58 and outer perimeter surface 56. The body 52 of the locating ring 50 also has a mounting face 60 on one side of the body and a locating face 62 on the opposite side of the body. The mounting face 60 and locating face 62 are spaced from one another and face in opposite directions along the center axis A such that each face is normal or perpendicular to the center axis. In this example, the mounting face 60 is flat or planar for mating with a surface of a mold part. Depending on the configuration and construction of the guard 54, the shape and contour of the locating face 62 can vary. The face of the body does not actually perform the locating function described here. However, the term is used herein merely to identify the face on the body 52 that is opposite the face mounted to the mold part.

As is known in the art, a locating ring is typically fastened to a surface of a mold part such as a mold tool. Thus, the typical locating ring is provided with one or more fastener receptacles for receiving fasteners and securing the locating ring to the mold part. In this example, the locating ring 50, and specifically the body 52, has two pairs of fastener receptacles 64 and 66 formed through the body parallel with the center axis A. In this example, each receptacle of the pair of fastener receptacles 64 is diametrically opposed from the other and formed as a standard, machined through bore 68 extending through the material of the body 52. If desired, the through bores 68 can have a stepped down diameter section for mating with the head of a fastener (not shown), if desired.

The other pair of fastener receptacles 66 has a different molded or cast construction. In this example, each of the pair of fastener receptacles 66 is also diametrically opposed from the other on the body 52. Each receptacle 66 has a notched section 70 that is semi-cylindrical in the direction of the center axis A, open to the locating face 62, and open to a portion of the perimeter surface 56. The notched section 70 terminates in advance of the mounting face 60, leaving a stepped surface 72 facing the locating face 62. A fastener bore 74 is formed through the stepped surface 72 for receiving a fastener (not shown) when mounting the locating ring 50 to a mold part. The head of the fastener will seat against the stepped surface 72 when the locating ring 50 is mounted.

As will become evident to those having ordinary skill in the art upon reading this disclosure, the configuration and construction of the fastener receptacles and mounting means for attaching the disclosed locating rings can vary considerably. The fastener receptacles 64 and 66 are described above merely to present two such examples. Other receptacle formations are certainly possible.

The guard 54 is configured having a plurality of separate and discrete bumper segments 80. The guard 54 in this example has four such bumper segments 80. Each bumper segment 80 has a forward face 82, a rear face 84, and a core 86 therebetween. The core 86 in this example can be a solid mass of material or can be hollow or partly hollow as needed or desired. The core 86 has an outer side 88 facing radially outward, an inner side 90 facing radially inward, and a pair of opposed ends 92. The core 86 is curved about the center axis A and follows the contour of the ring shape of the body 52. Thus, the outer side 88 has a convex curvature and the inner side 90 as a concave curvature. In this example, the core 86 of each bumper segment 80 has a curvature that forms a segment of an arc matching that of the annular body shape. Each bumper segment 80 has a stop flange 94 of a larger size than the adjacent core 86 at the rear face 84. The stop flange 94 forms a shoulder 96 facing in the direction of the forward face 82 on each bumper segment 80. In an alternate example, the stop flange or some other connector ring can be formed integrally joining the segments to one another in a one-piece guard structure that is otherwise similar to the segmented structure of this embodiment.

In this example, the body 52 has a corresponding number or plurality of bumper holes 98 formed through the body. In this example, the body 52 has four such holes 98 to correspond one each with the four bumper segments 80. The bumper holes 98 are intermittently dispersed around the circumference of the body 52 between respective ones of the fastener receptacles 64 and 66. The holes 98 are formed through the body 52 generally parallel to the center axis A. The shape and configuration of the bumper holes 98 match that of the bumper segments 80. As shown in FIG. 3, each of the bumper holes 98 has an entry opening 99 in the mounting face 60 that is larger in size than the majority of the remainder of the hole. The entry opening 99 defines a stepped surface 100 facing the mounting face 60. The shoulder 96 on the stop flange 94 of each bumper segment is borne against the stepped surface 100 in its corresponding bumper hole 98. This engagement insures proper positioning and retention of the bumper segments 80 relative to the body 52. As shown in FIGS. 1 and 3, exposed ends of the bumper segments 80 protrude forward from the locating face 62 on the body. Also, the segments are sized so that they are radially within the boundary of the perimeter surface 56. Thus, no part of the guard 54 extends radially outward beyond a corresponding part of the body 52.

The disclosed locating ring, and particularly the body 52, can be formed from a metal material, thus achieving the desired very tight tolerance control. However, the body 52 can be fabricated using much less expensive base or stock material and less elaborate fabrication processes. In one example, the body 52 can be formed of powdered metal, sintered metal, or "white" metal. These types of materials can be formed utilizing a casting or molding process. Such materials are relatively lightweight in comparison to other steel materials. Such materials can be relatively brittle and might have been previously considered unsuitable for use as a locating ring for an injection mold tool. However, the disclosed locating ring 50 employs the guard 54, which can take the brunt of almost any impact during mold machine set up. Thus, the disclosed locating ring 50 is a significant improvement over prior known, conventional steel locating rings. In one alternative, it is certainly possible to fabricate the body 52 from conventional steel and using a conventional machining process. Such a locating ring body can still be utilized with a guard as disclosed and described herein.

Known or existing locating rings are made from machined steel bar stock. They are sliced off individually and then CNC turned one at a time. They cannot be heat treated or they would impart even more damage to the mold parts and surfaces than they currently cause. A locating ring as disclosed herein can be made from sintered metal, casted, or even machined, and can actually be hardened (sintered metal is in fact hardened) giving such a locating ring improved structural strength. However, employing a resilient or softer guard as disclosed herein prevents the locating face portion of the ring from ever contacting the machine platen so the ring body portion cannot damage the platen face. The hardness of the body, coupled with the guard, will actually improve the ring locating function because the body can/will be hard and will better hold a true original size over time in comparison to a non-hardened, conventional, machined steel, locating ring.

The guard 54, and particularly the bumper segments 80 in this example, can also be connected to the body 52 in a number of different ways. In one example, the bumper segments 80 can be fabricated separately from the body 52, inserted into the bumper holes 98 in a subsequent assembly process, and adhered to the surfaces of the holes 98. The segments 80 can be connected or adhered utilizing suitable fasteners, adhesives, heat welding, molecular bonding, or the like. Alternatively, the bumper segments 80 can be inserted into the bumper holes 98 without any particular adhesion, other than perhaps a friction fit, between the body and the core segments. The stop flange 94 and step 100 associated with each bumper segment 80 will properly locate and position the bumper segments 80 relative to the body 52 in this example. The bumper segments 80 will then be captured between a mold part surface and the body 52 when the locating ring 50 is mounted to the mold part. The guard 54, including each of the bumper segments 80, would then be secured in place during use.

In another example, the body 52 can be fabricated and then placed in a secondary mold as an insert. The guard 54, including each of the bumper segments 80 in this example, can then be molded and formed as a part of the locating ring 50 producing a finished product from the mold. Surface bonding between the body 52 and bumper segments 80 can occur during the molding process when forming the guard 54. In this example, and in each of the subsequently described examples, the guard 54 is formed of a non-metal material that is softer than the metal material of the body 52.

Any number of materials and processes can be utilized to form the guard 54. For example, the guard 54 can be formed of a suitable polymer material that is highly durable and yet somewhat forgiving when contacting another object. Examples of suitable materials that can be used to form the guard 54, and other guards disclosed and described herein, include thermoplastic elastomer, thermoplastic rubber, thermoplastic resins of any type, thermoset elastomers, thermoset rubber, or thermoset resins of any type.

Processes and materials for fabricating and connecting a resilient locating ring to the metal body as disclosed herein are many. The product can be insert molded, direct molded, mechanically retained (screws, drive pins, spring pins, mechanical clamp) chemically bonded, adhered, spin welded (resilient material or hard plastic), ultrasonically bonded (hard plastic), heat staked, sprayed on as a coating, dipped into a bath, electrostatically built up, or the like.

Alternatives to the non-metal guards are also possible. A soft metal guard, such as aluminum, bronze, brass, or the like, could be inserted or fastened to the ring body so as to achieve some degree of protection against damage. Such metals are soft by comparison to the material of the machine platens and therefore also will not damage a typical platen either. Such bi-metal locating rings, however, might be significantly more expensive to manufacture than a ring with a resilient non-metal insert. Such bi-metal locating rings might be suitable in other manufacturing sectors, other than the injection molding example described herein. Die casting processes may benefit from using locating rings as described herein. However, the heat environment of a die casting operation is severe, such as over 900 degrees Fahrenheit. A locating ring with a resilient, non-metal locating ring guard would likely not tolerate that degree of heat, but an aluminum or brass guard would likely be quite suitable. Non-ferrous, softer metals may be suitable guard materials in some applications. As noted above, such materials can include aluminum, brass, bronze, or any relatively metal (relative to the locating ring body material and/or the platen material, preferably soft to minimize platen impact damage).

FIGS. 4-7 show one example of the locating ring 50 in use during setup on an injection mold machine 110. In this example, components of the injection mold machine 100 are shown relatively simplistically (specifically, the stationary platen 112). Those having ordinary skill in the art will recognize that details of the injection mold machine and its various components can vary from those depicted herein, as can the mold parts of the machine. The parts of the injection mold machine 110 described herein are simply provided to illustrate the function, performance, and method of use of the locating ring 50 and the other locating rings described herein.

In the disclosed example, the injection mold machine 110 has a second mold part or stationary platen 112 with a second surface or flat platen contact surface 114 on one side or face of the platen. A locating hole 116 is formed in the stationary platen 112 and through the platen contact surface 114. The locating hole 116 has a tapered rear end 118. An injection nozzle or other such injection mold parts can be placed or positioned in the tapered rear end 118. Such components can access a sprue bushing or nozzle seat through the locating ring 50, and specifically the central opening 59, as is known in the art, so as to deliver or inject molten material to a mold cavity. Such details are not particularly relevant to the invention disclosed and described herein and thus are not further described. Those having ordinary skill in the art will recognize that potential differences and variations in the injection mold machine components and arrangement are certainly within the spirit and scope of the present mention.

In this example, the injection mold machine 110 also includes a movable, first mold part or mold tool 120. The mold tool 120 in this example is suspended by a chain 122, as is known in the art. The mold tool 120 can be provided in various segments as shown that are arranged to create a mold cavity therein. One or more injection molded parts are typically formed within the mold cavity. In this example, the mold tool 120 has a first surface or contact surface 124 on one side or face of the tool. The locating ring 50 is mounted in a receiving pocket (not shown) in the contact surface 124 utilizing fasteners (not shown) in combination with the above-described fastener receptacles 66. Though not shown herein, the locating ring 50, including the central opening 59 thereof, are typically aligned with a sprue bushing in the mold tool 120 and an injection nozzle of the molding machine. The sprue bushing and injection nozzle are in fluid communication with one another.

Figure 4:
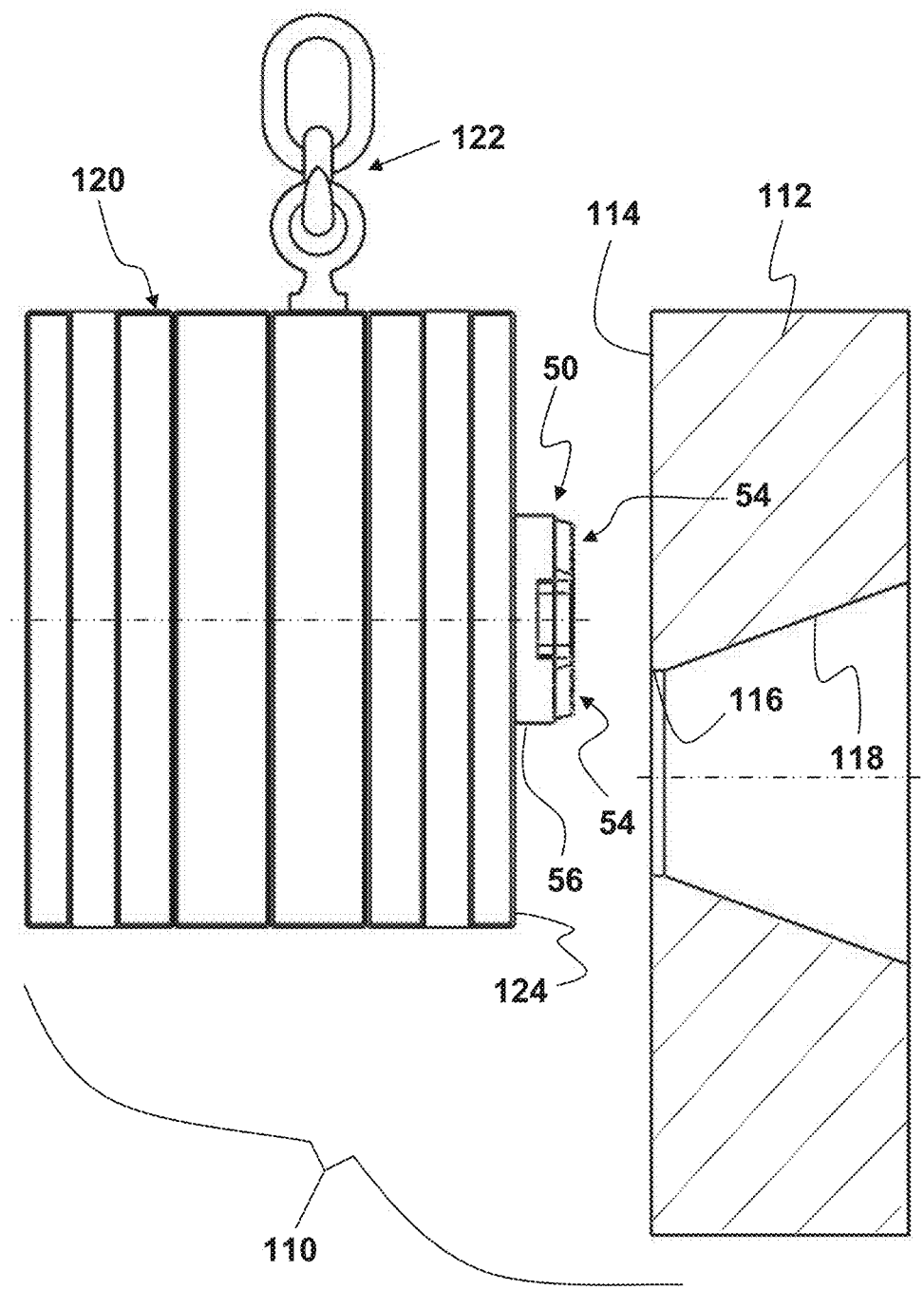
FIG. 4 shows a simplified side view of the locating ring in FIG. 1 and mounted to a mold tool positioned in close proximity to a machine platen.
Figure 5:
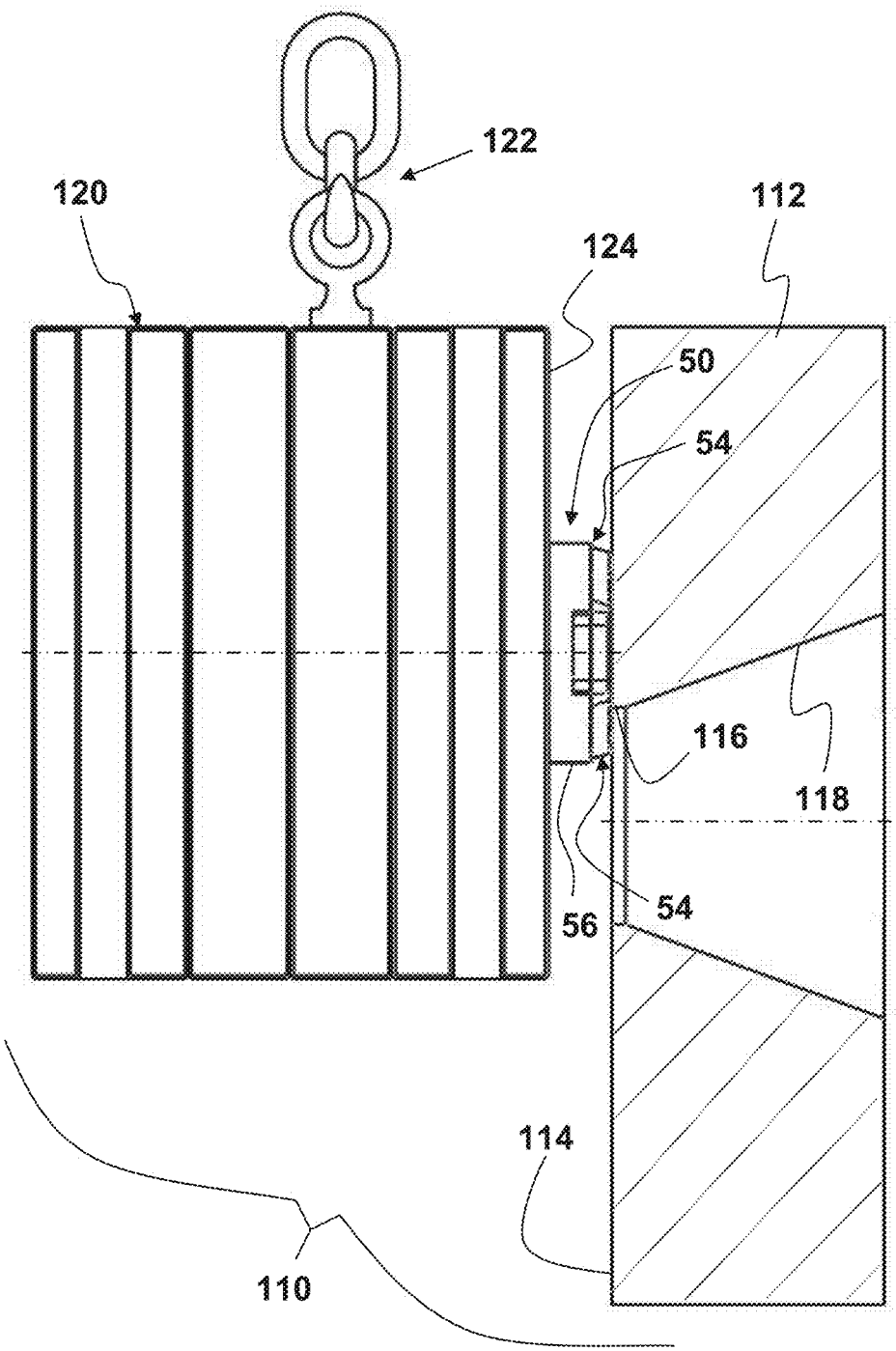
FIG. 5 shows the mold tool in FIG. 4 misaligned with the machine platen and with the locating ring contacting a surface of the machine platen.

In the disclosed example, once the mold tool 120 is suspended from the chain 122, an operator is free to move or arrange the mold tool 120 and the platen 112 in relative close proximity to one another. Since the mold tool 120 is movable and the platen 112 is stationary, the operator can reposition and maneuver the mold tool 120 such that its contact surface 124 faces the platen contact surface 114 as shown in FIGS. 4 and 5. Thus, the locating ring will also face toward the platen 112. The operator then moves the mold contact surface 124 toward the platen contact surface 114 as in FIG. 5.

The operator can move the mold tool 120 while attempting to align the locating ring 50 with the locating hole 116. As is well known in the industry, this is a difficult task. The mold tool 120 is significantly heavy, bulky, and quite large. It is difficult or nearly impossible for the operator to maneuver the mold tool while still being able to see both the locating ring 50 and the locating hole 116. In addition, when the two mold parts 112, 120 get close to one another, neither the locating ring 50 nor the locating hole 116 may be visible at all to the operator. The operator of a typical injection mold machine also must be extremely careful while positioning the mold parts to prevent damage to the surfaces and the locating ring. The operator must make careful, micro-adjustments while positioning the mold tool to avoid hard contact between the components. This can add significant time delays to the process.

Figure 6:
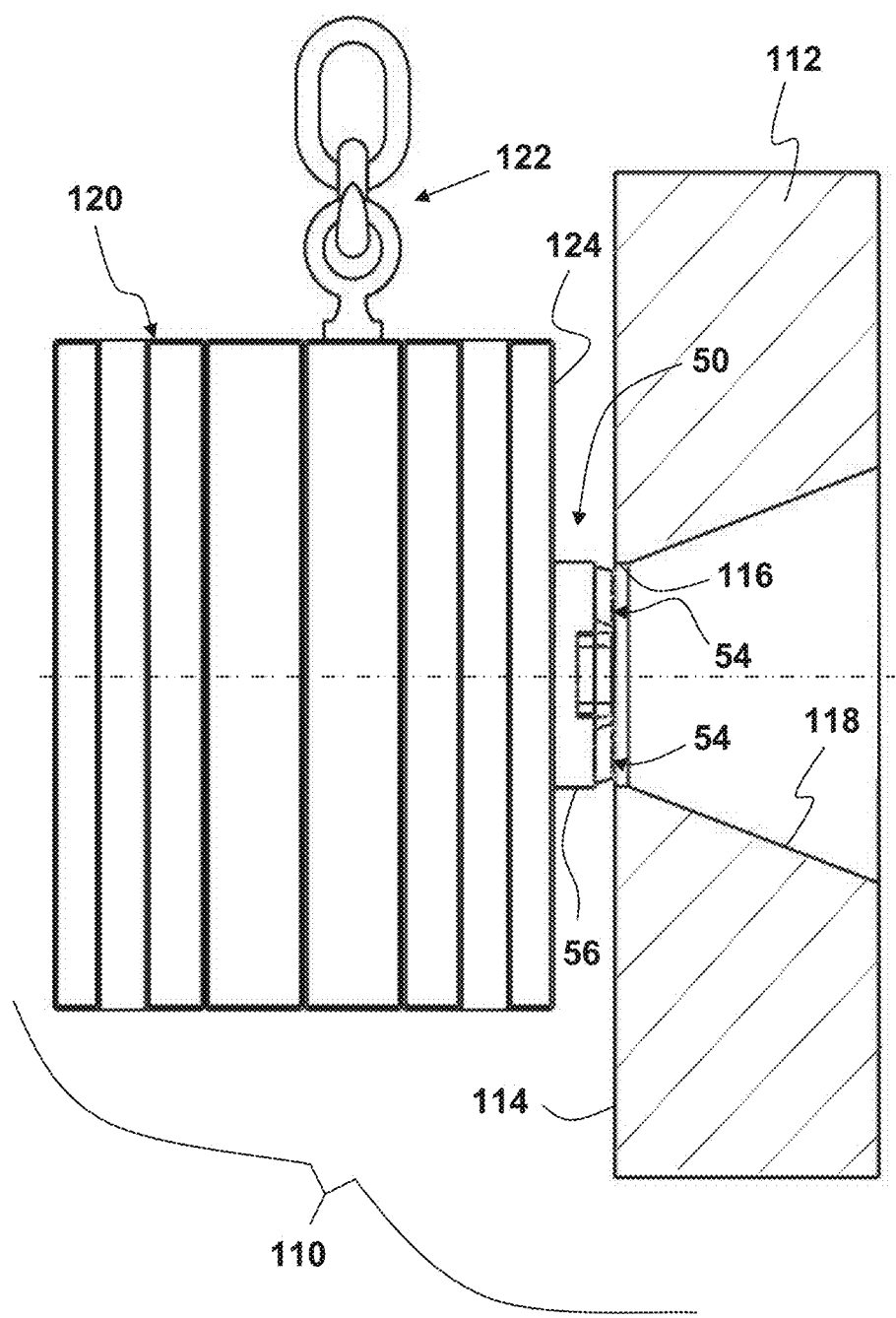
FIG. 6 shows the mold tool and machine platen in FIG. 5 aligned with one another but not yet engaged.
Figure 7:
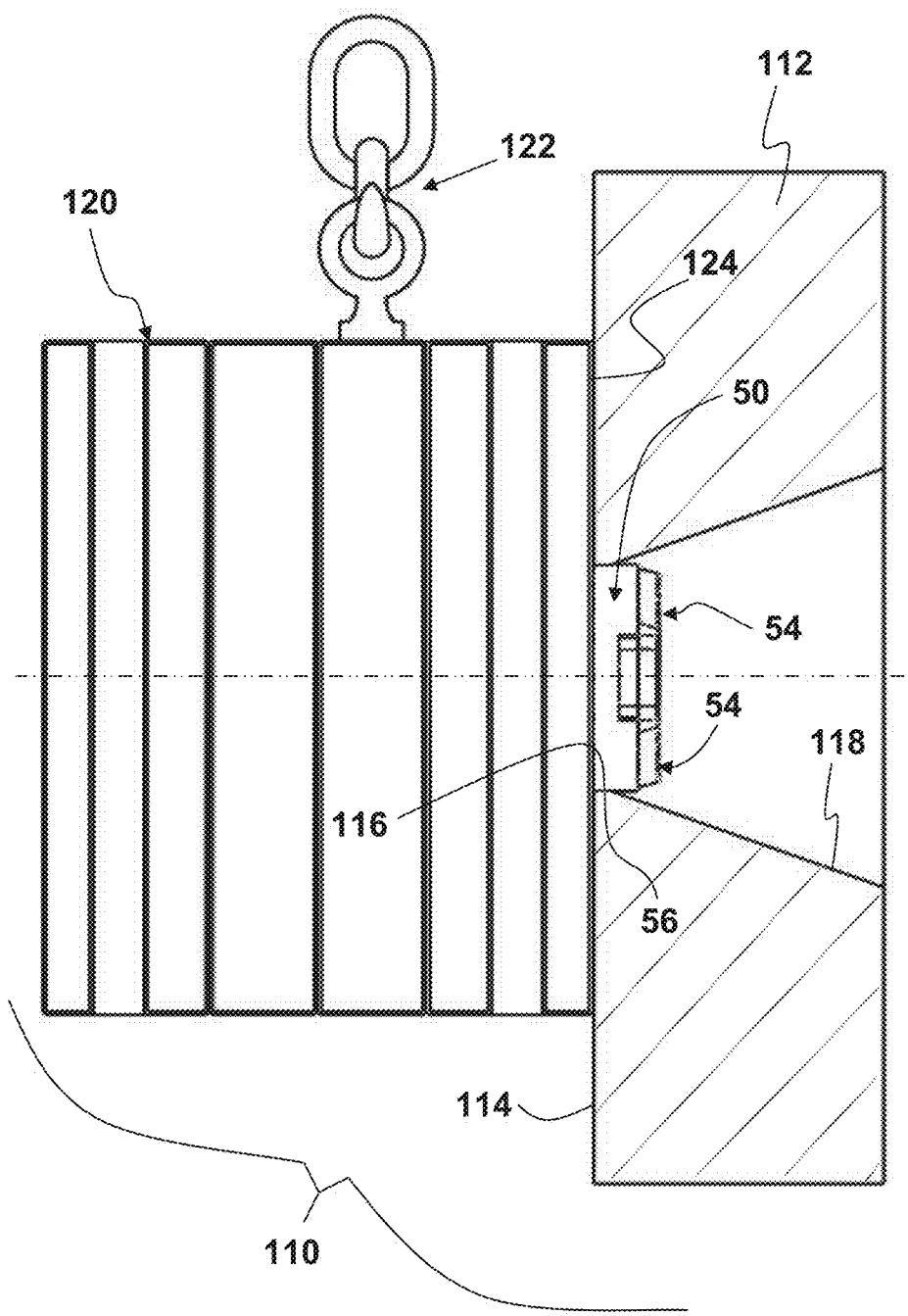
FIG. 7 shows the mold tool and machine platen in FIG. 6 aligned with and engaged to one another.

As again depicted in FIG. 5, the operator can move the mold tool 120 toward the platen 112 until the locating ring 50 contacts the platen contact surface 114. In a conventional operation, the metal locating ring can easily damage the contact surface of the platen, the locating ring, or both, even under the slightest amount of contact. However, in the disclosed example, the guard 54 will instead contact the platen contact surface 114, resulting in virtually no damage to either components. The operator can continue to move the mold tool 120 as the guard 54 contacts or even bounces against the platen contact surface 114 until the locating ring 50 registers with the locating hole 116. At this point, the locating ring 50 will begin to enter the locating hole 116, as shown in FIG. 6. The operator can continue to reposition the mold tool 120 relative to the platen 112 until the locating ring 50 is completely or fully registered in or aligned with the locating hole 116. The operator can then further move the mold tool 120 toward the platen 112 until the locating ring 50 fully seats within the locating hole 116 as shown in FIG. 7. When fully seated, the platen contact surface 114 and tool contact surface 124 fully engage with and lie flat against one another. The mold tool 120 and platen 112 in this example can then be clamped to one another (not shown) rendering the injection mold machine 110 ready for further set up and eventual use.

The locating ring 50 is mounted to the movable mold part, i.e., the mold tool 120, in this example. It is possible that the locating ring 50 be mounted to the stationary mold part, such as the platen 112 in this example. In such an example, the locating hole 116 would then be provided on the movable mold part. Such an arrangement may be more suited to other processes, other than the disclosed injection molding example, where the process utilizes one or more locating type rings and may benefit from use of the disclosed locating rings.

In a typical injection molding process, it is critical that no damage occur to the locating ring 50, the surfaces of the locating hole 116, the platen contact surface 114, and/or the mold tool contact surface 124. Damage to any of these surfaces can cause significant downtime to the old tool to repair the damaged surfaces or components, and then replace and/or reassemble and set up the machine. Damage to any of the surfaces can also result in significant cost, as it is quite expensive to re-machine, rework, or reform surfaces on such mold components. Similarly, once a mold tool is reworked, it may not perform as well as originally intended and may have compromised or reduced structural integrity and durability. The disclosed locating ring 50 and corresponding guard 54 alleviate or completely eliminate many of these problems. The forward face 82 of the guard 54, and particularly the bumper segments 80 in this example, will protect both the locating ring 50 and the platen contact surface 114 during mold set up. The guard 54 will also allow the operator considerably more leeway to be less precise or careful and both micro- and macro-position or adjust the mold part without risking damage to the mold machine components. The operator need be less careful until the locating ring 50 and locating hole 116 are essentially aligned, as in FIG. 6. This can speed up the mold machine setup process.

Utilization of a locating ring constructed in accordance with the teachings of the invention, and particularly the non-metal material of the guards, can provide additional benefit to various entities. For one, the guard 54 can be molded in virtually any desired color or color combination. The guard 54 can be fabricated to include visual indicia of virtually any type. For example, product information, mold characteristics or data information, marketing information, corporate logos, and/or the like. Thus, a locating ring as disclosed and described herein can be mounted to a mold part with such information or indicia readily visible on the part and the ring. Supplier visibility or awareness may be enhanced, whether it is the mold manufacturers, the locating ring manufacturers, or some other entity's information visible on the guard. This is because any such indicia provided on the guard material will be readily visible. The guards can be provided with different combinations of color, symbols, logos, artwork, and/or alphanumeric indicia thereon. The guard can be fabricated to achieve a particular purpose or benefit, determined and/or dependent upon a particular use.

The disclosed locating ring 50 is described above as being mounted to a mold tool 120, which in turn is clamped to a mold platen 112. As will be evident to those having ordinary skill in the art, the locating ring 50 can be mounted to other such mold parts and still be utilized as described herein. For example, the locating ring 50 can be used to locate or align portions of a mold tool or cavity with other portions of a mold tool or cavity, if desired.

As noted above, the configuration and construction of the locating ring 50 can vary from the example shown. Other examples are now described herein utilizing the remaining figures. Each of the below-described locating rings can be used in essentially the same manner as described above with respect to the locating ring 50.

Figure 8:
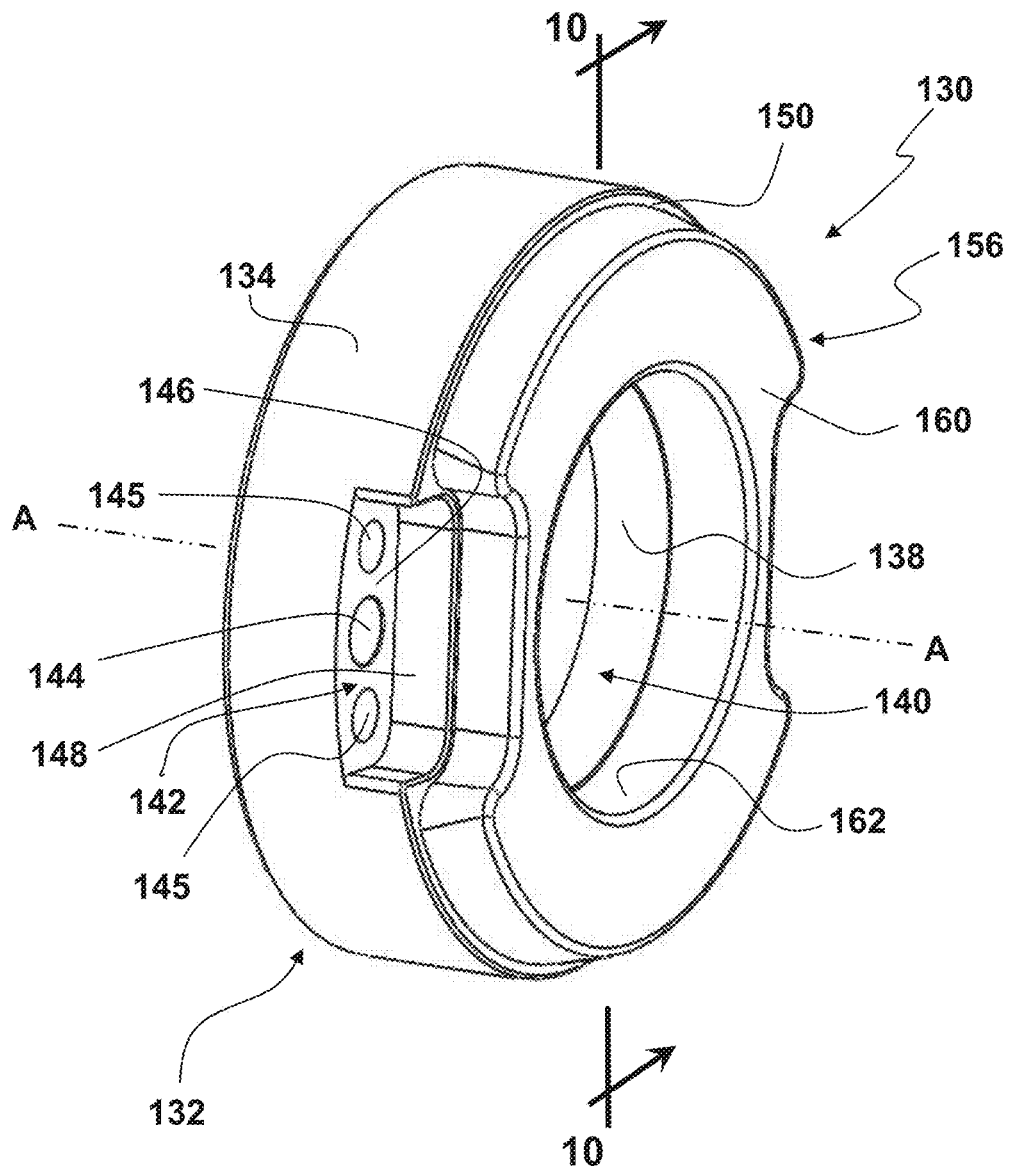
FIG. 8 shows a perspective view of another example of a locating ring constructed in accordance with the teachings of the present invention.
Figure 9:
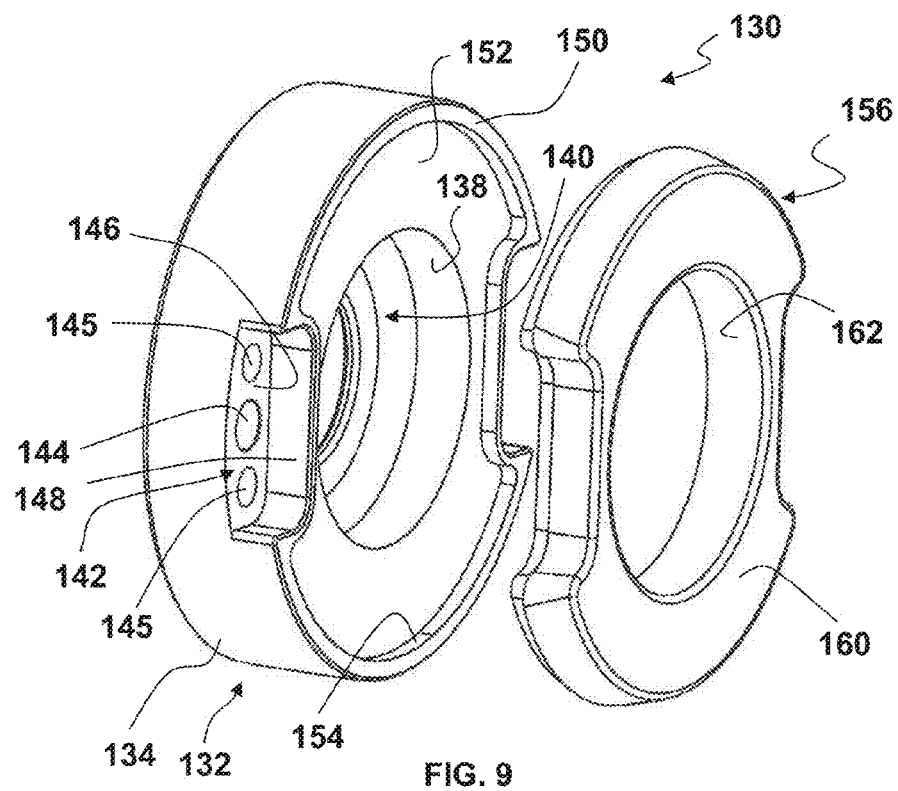
FIG. 9 shows an exploded perspective view of the locating ring in FIG. 8.
Figure 10:
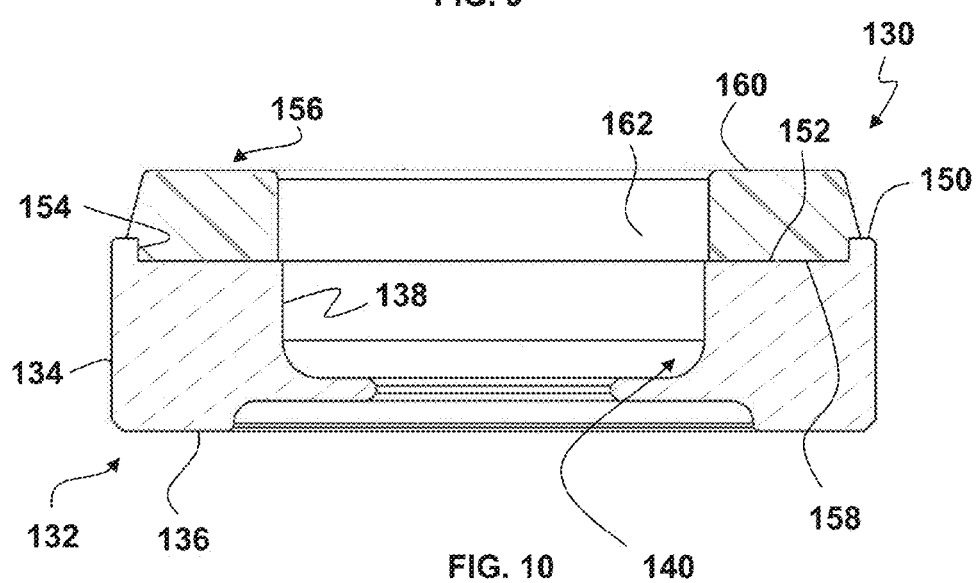
FIG. 10 shows a cross-section taken along line 10-10 of the locating ring in FIG. 8.
Figure 11:
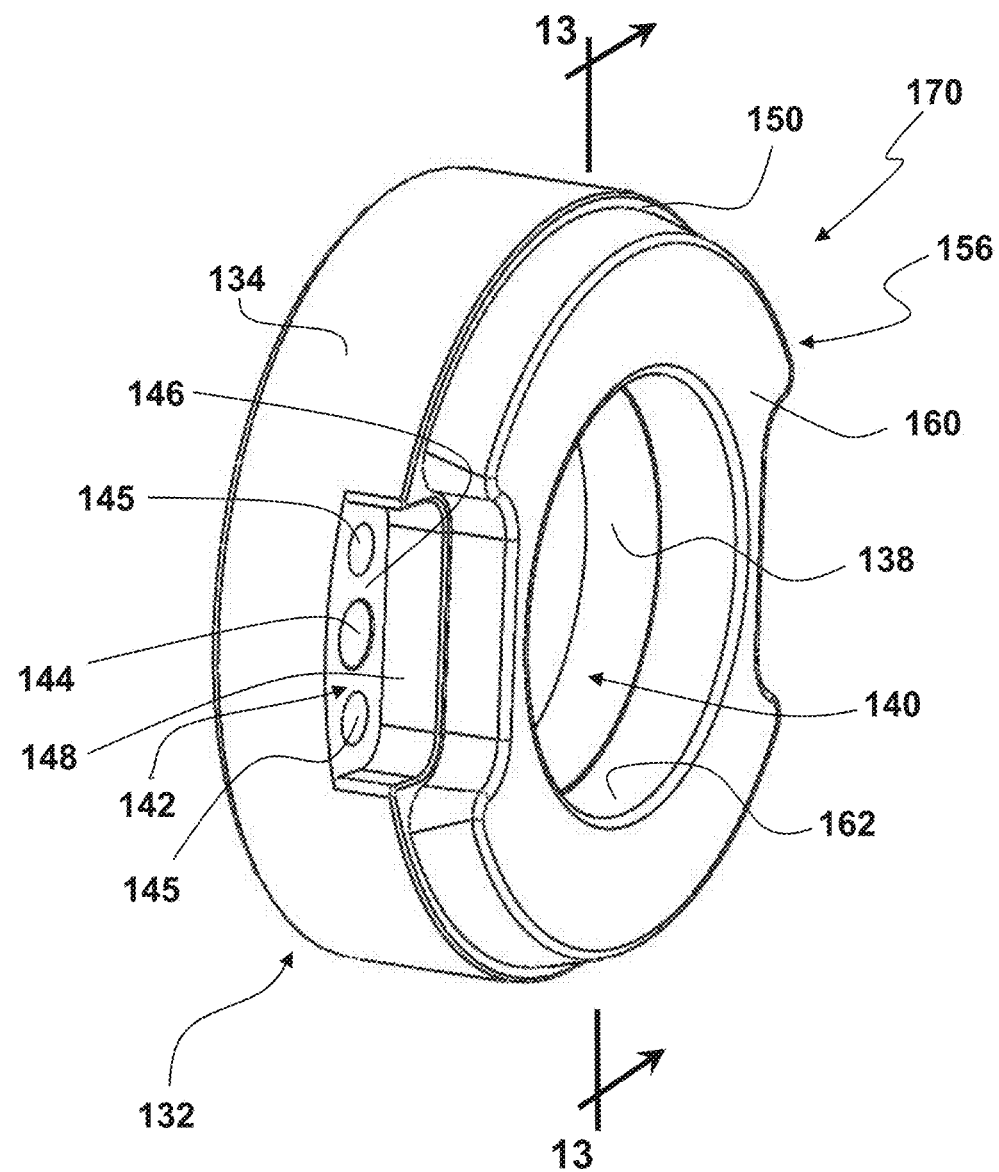
FIG. 11 shows a perspective view of another example of a locating ring constructed in accordance with the teachings of the present invention.
Figure 12:
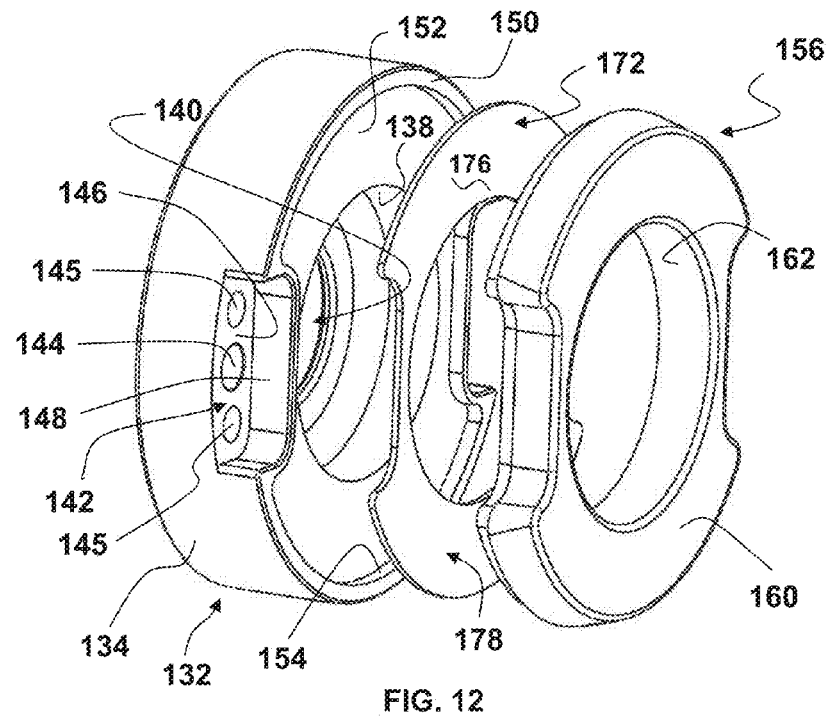
FIG. 12 shows an exploded perspective view of the locating ring in FIG. 11.
Figure 13:
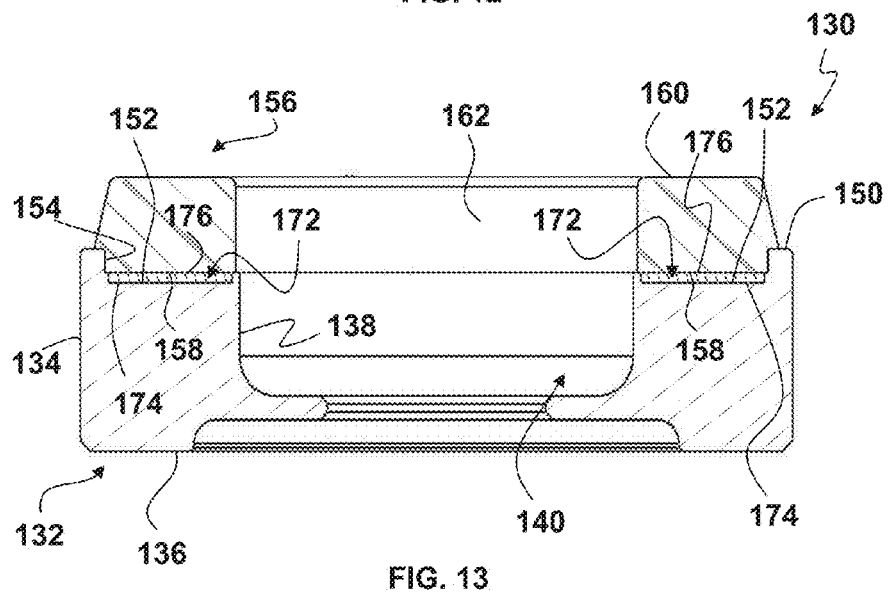
FIG. 13 shows a cross-section taken along line 13-13 of the locating ring in FIG. 11.

FIGS. 8-10 show another example of a locating ring 130 constructed in accordance with the teachings of the present invention. In this example, the locating ring 130 has a body 132 also formed having a ring shape or annulus configuration. The body 132 has an outer perimeter surface 134, a mounting face 136, an inner annular wall 138, and a central opening 140 formed through the body and defined by the inner annular wall. The body 132 also has a center axis A. A pair of diametrically opposed fastener receptacles 142 are provided on the body 52. In this example, the fastener receptacles 142 each include a center fastener bore 144 formed in a step surface 146 adjacent a notched section 148 in the body. The fastener bore 144 is flanked by two jack screw holes 145, which would include threads matching that of the fasteners (not shown). One opposed pair of the jack screw holes can have English unit threads and one opposed pair of jack screw holes can have metric threads in order to accommodate more than one type of application. In the event that residual plastic has leached out and cured, it can overhang the locating ring and make removal difficult. The fasteners are removed from the bores 144 and then threaded into these jack screw holes 145. When the fastener tip contacts the bottom of the ring pocket, the fasteners drive the ring out, either deforming or breaking the cured leached material and releasing the lodged locating ring. The body 132 in this example thus illustrates yet another optional fastener receptacle construction.

The body 132 also has a locating face 150 opposite the mounting face 136, as depicted in FIGS. 9 and 10. The locating face 150 in this example has a recessed region 152 in the body 132. The recessed region 152 is surrounded by a short rim or rib 154 that projects forward from and defines the boundary of the recessed region. The locating ring 130 in this example also has a contiguous guard 156. In this example, the guard 156 has a footprint or shape that mirrors that of the recessed region 152 of the locating face 150. The guard 156 has a thickness such that it protrudes forward from the locating face 150. Again, the perimeter of the guard 156 is completely within the perimeter of the body 132 in a radial direction. The guard 156 in this example has a rear face 158 that lies against the locating face 150 and has an exposed forward face 160. The guard 156 also has an interior opening 162 that coincides with the central opening 140 of the body 132. As noted above, the guard 156 can be connected to the body 132 in any number of suitable ways.

Likewise, the body 132 can be formed of a powdered or sintered metal or "white" metal material utilizing a less expensive manufacturing process.

FIGS. 11-14 illustrate another example of a locating ring 170 constructed in accordance with the teachings of the present invention. The locating ring 170 in this example has numerous similarities to the prior described locating ring 130. Therefore, like reference numerals represent like parts between the two ring examples. The locating ring 170 has a body 132 and a guard 156 that are essentially identical to those described above with respect to the locating ring 130. However, the locating ring 170 in this example includes an additional component sandwiched between the body and guard. In this example, the locating ring 170 has an insert 172 constructed in the form of a ring shaped plate. The insert 172 has the same footprint or shape as the recessed region 152 in the locating face 150 on the body 132. The insert 172 has a back side 174 that lies against the surface of the recessed region 152 when properly placed. The insert 172 also has a front side 176 that faces the guard 156. The insert 172 can be assembled in a variety of ways, depending on how the guard 156 is attached to the body 132. In one example, the insert 172 can be placed on or adhered to the surface of the recessed region 152 after fabrication of the body 132 and prior to placing the body into a mold cavity for forming the guard 156. The insert 172 would then be encapsulated between the overmolded material of the guard 156 and the body 132. In another example, the insert 172 can be applied to the rear face 158 of the guard 156 after the guard is formed. The guard 156 can then be connected or adhered to the body 132. Instead, the insert 172 can be insert molded as an embedded part of the guard 156, if desired.

In this example, the guard 156 can be formed of a transparent or translucent material, such as a clear urethane, polyurethane, thermoplastic elastomer, thermoplastic rubber, or the like. The front side 176 of the insert 172 can include indicia 178, as described above, provided thereon. The indicia 178 will then be visible through the material of the guard 156. Again, the indicia 178 can represent any type of information desired by an entity interested in obtaining a financial, marketing, or other type of advantage or benefit.

In the prior described examples, the guards were more or less permanently affixed or connected to the locating ring bodies. However, the guards can be configured as a removable part, if desired for a particular application. A number of the following examples illustrate such guard potentially removable configurations.

Figure 14:
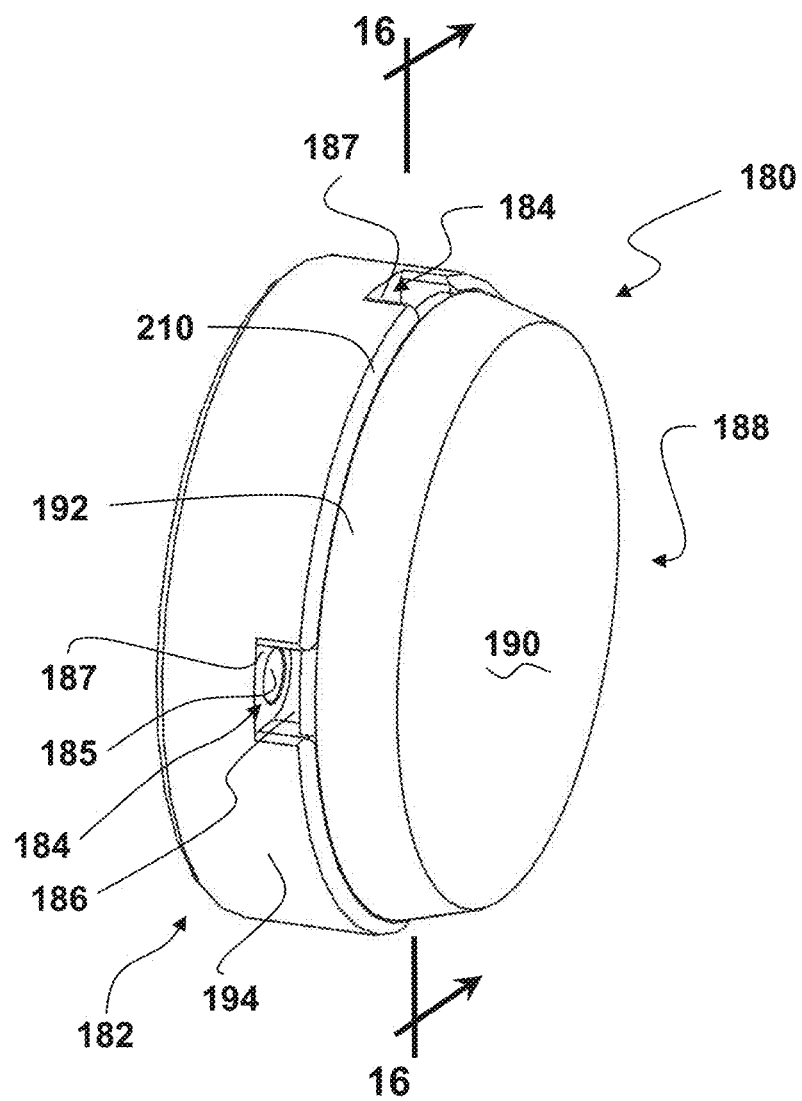
FIG. 14 shows a perspective view of another example of a locating ring constructed in accordance with the teachings of the present invention.
Figure 15:
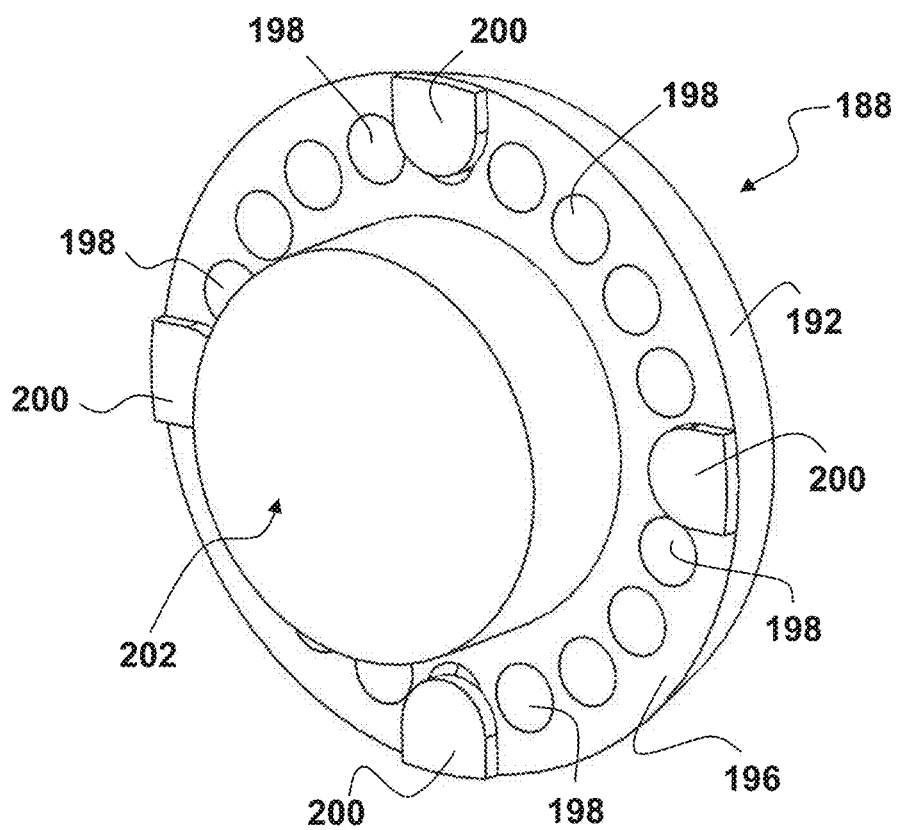
FIG. 15 shows a rear perspective view of a guard portion of the locating ring in FIG. 14.
Figure 16:
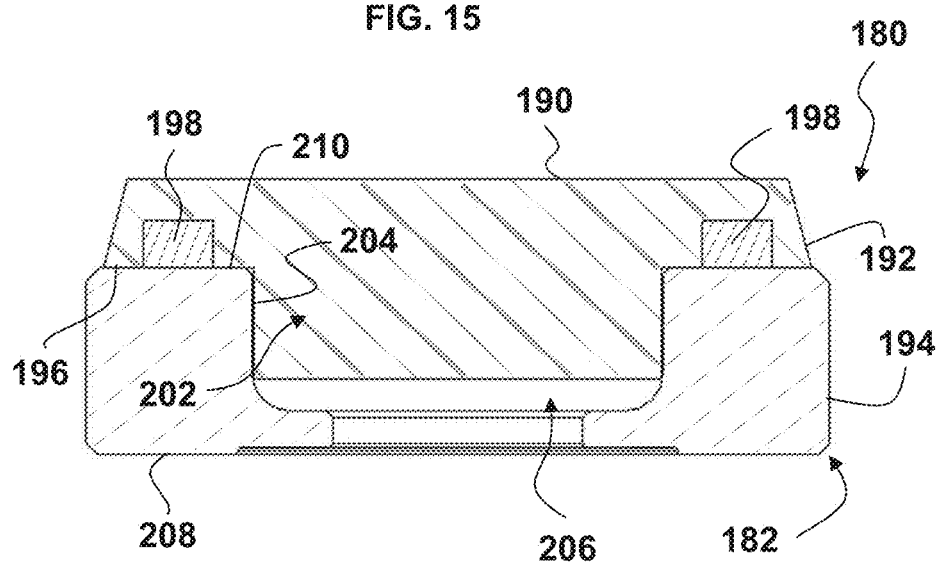
FIG. 16 shows a cross-section taken along line 16-16 of the locating ring in FIG. 14.

FIGS. 14-16 illustrate another example of a locating ring 180 constructed in accordance with the teachings of the present invention. In this example, the locating ring 180 has a body 182 that can be constructed similar to or different than the prior described bodies. The body 182 in this example has a plurality of fastener receptacles 184 spaced apart around the body. In this example, the fastener receptacles 184 are essentially the same as the receptacles 66 described above with reference to the locating ring 50. Thus, each of the fastener receptacles 184 has a notched section 186 of a semi-spherical configuration, and a bore 185 formed through a stepped surface 187.

In this example, a guard 188 is provided as a removable element of the locating ring 180. The guard 188 is a puck shaped circular object with a front face 190 and a circumferential sidewall 192. As with each of the prior embodiments, the circumferential sidewall 192 is inside or radially within a perimeter surface 194 on the body 182. The guard 188 in this example is a relatively solid object with no central opening as in the prior examples. With reference to FIG. 15, the guard 188 also includes a rear face 196 with a plurality of magnets 198 either exposed through the rear face 196 or in close proximity to the rear face. One might wish to completely encase the magnets in the guard material (not shown) so as to prevent the magnets from releasing from the guard when removed from the body. The magnets 198 are positioned circumferentially around the rear face 196 adjacent the sidewall 192. A plurality of protrusions 200 are spaced apart circumferentially around and project from the rear face 196 on the guard 188 in this example. The protrusions 200 are shaped to register with and be received in one of the corresponding notched sections 186. The protrusions 200 can help to properly position and retain the removable guard 188 on the body 182 of the locating ring 180 in this example. The guard 188 also has a cylindrical plug 202 projecting from the center of the rear face 196.

Even though the guard 188 has no central opening, the body 182 still includes an interior annular wall 204 that defines a central opening 206 through the body. The plug 202 is sized to closely fit within the central opening 206. The body 182 has a mounting face 208 and an opposite locating face 210. The magnets 198 are configured to attract and hold the guard 188 to the body 182. The guard 188 can be removed from the body 182 simply by breaking the bond between the magnets 198 and the locating face 210 of the body. The guard 188 in this example can be temporarily applied to a conventional locating ring, which would be configured identical or similar to the body 182, and then used to properly position, align, and secure mold parts as described above. The guard 188 can then be withdrawn or removed from the body 182 through the locating hole 116, via the tapered rear section 118, as needed for operation of an injection molding machine. As a result, the locating ring 180 in this example can be provided with a unique body 182 and corresponding guard 188 to form a locating ring that functions as the previously described rings. Alternatively, the guard 188 can be provided to retrofit an existing or conventional locating ring, if desired.

FIGS. 17-21 illustrate additional examples of locating rings constructed in accordance with the teachings of the present pension. In each of these examples, the locating rings have a body that is substantially identical to the body 182 described above for the prior example. Thus, like reference numerals will be utilized to represent like parts in comparison to the body 182 and details of the bodies in each of these examples will not be further described.

Figure 17:
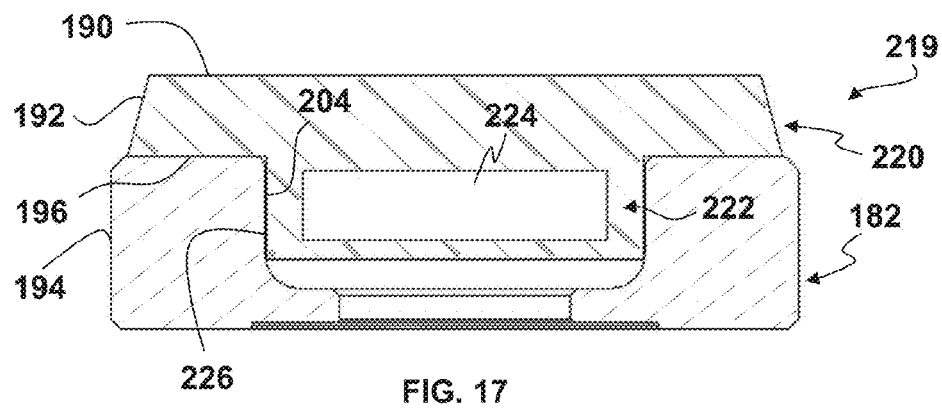
FIG. 17 shows a cross-section view of another example of a locating ring constructed in accordance with the teachings of the present invention.

FIG. 17 shows one example of a locating ring 219 constructed in accordance with the teachings of the present invention. In this example, the locating ring 219 has a guard 220 that is similar in construction to the guard 188. Thus, the guard 220 has a front face 190, a sidewall 192, a rear face 196, and a center plug 222. The guard 220 in this example does not include magnets to hold it in place on the body 182. Instead, the guard includes an inflatable bladder 224 within the interior of the plug 222. Though not shown herein, the inflatable bladder 224 can communicate with a valve or mechanism that is accessible from the exterior of the guard. The bladder 224 can be expanded so that the plug 222 creates an interference fit between an exterior surface 226 of the plug 222 and the interior wall 204 within the central opening 206 on the body 182. The guard in this example is again a removable element that can be configured to cooperate with a unique locating ring body 182 or to retrofit an existing or conventional locating ring. The plug 222 and bladder 224 can be configured so that the guard 220 can accommodate different sized openings and thus, different sized locating rings, if desired.

Figure 18:
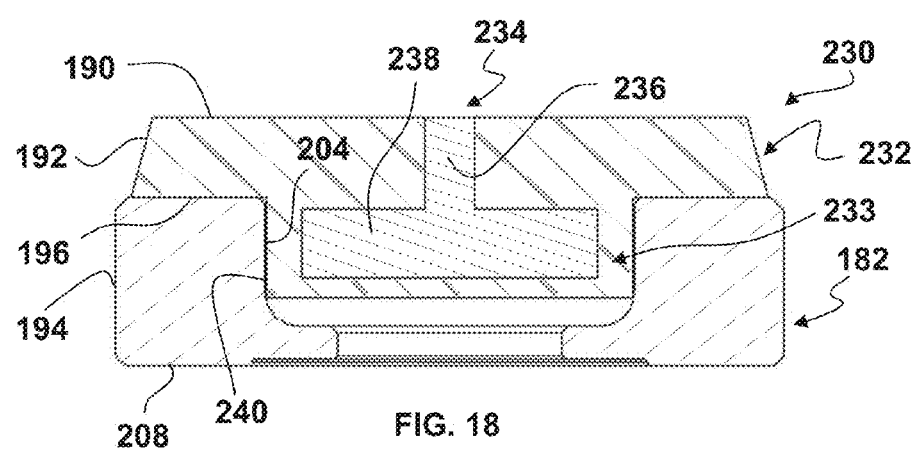
FIG. 18 shows a cross-section view of another example of a locating ring constructed in accordance with the teachings of the present invention.

FIG. 18 shows another example of a locating ring 230 constructed in accordance with the teachings of the present invention. In this example, the locating ring 230 has a guard 232, again similar in configuration to the previously described guards 188 and 220. In this example, the guard 232 has a front face 190, a perimeter sidewall 192, a rear face 196, and a plug 233. In this example, the plug 233 again has an outer surface 240 that interferingly contacts the interior wall 204 within the central opening 206 of the body 182. In this example, a mechanical cam 234 has a tool access 236 projecting to and accessible from the front face 190 of the guard 232. The mechanical cam 234, and particularly the tool access 236, is connected to and has a cam device 238 embedded in the plug 232. The cam device 238 can be manipulated or rotated via the tool access 236 in order to increase or decrease the diameter of the outer surface 240 on the plug 233. Thus, surface interference between the plug and the central opening of the body 182 will selectively retain the guard 232 connected to the body 182. Again, the plug 233 and mechanical cam 234 can be provided so that the guard 232 accommodates a variety of different sized locating rings and openings.

Figure 19:
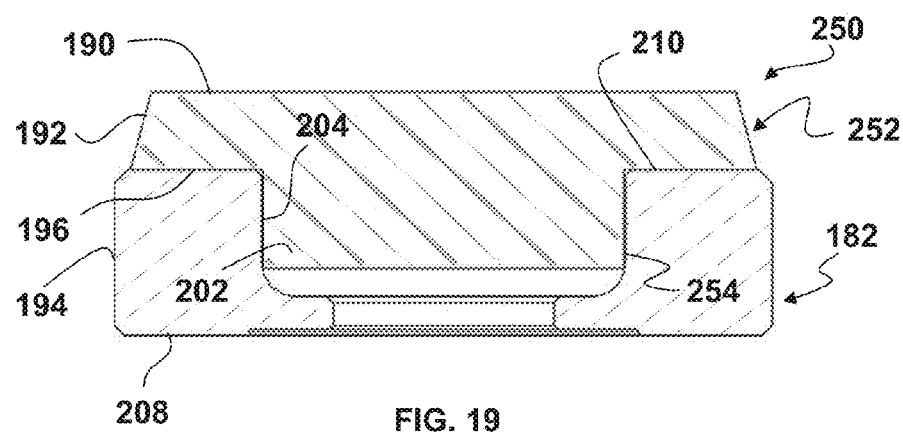
FIG. 19 shows a cross-section view of another example of a locating ring constructed in accordance with the teachings of the present invention.

FIG. 19 shows yet another example of a locating ring 250 constructed in accordance with the teachings of the present invention. In this example, the locating ring 250 has a guard 252 that is a relatively simple in construction. The guard 252 is again a removable element and has a front face 190, a sidewall 192, a rear face 196, and a plug 202. The guard 252 is very similar to the earlier described guard 188, which included magnets. The guard in this example has no magnets. Instead, the plug 202 has an outer surface 254 that is configured to create an interference fit with a specific size central opening 206 in the body 182 of the locating ring 250. Again, the guard 252 is configured as a removable element that can be provided to accommodate a specific body 182 or to retrofit an existing locating ring having a specific size central opening.

FIGS. 20 and 21 illustrate yet another example of a locating ring 260 constructed in accordance with the teachings of the present invention. In this example, the locating ring has a body 182 and a simple cylindrical plug or guard 262 that is inserted into the central opening 206 of the body. The guard 262 has an outer circumferential surface 264 sized to interferingly fit within the central opening 206. The guard has a length or depth between a back surface 266 and an opposed front surface 268 such that a good portion of the guard 262 protrudes forward from the locating face 210 on the body 182 to perform the previously described functions of the guard. Again, the guard 262 or plug in this example can be provided with a specific body 182 to create the locating ring 260 or can be provided to retrofit an existing or conventional locating ring having a specifically size central opening 206.

Figure 22:
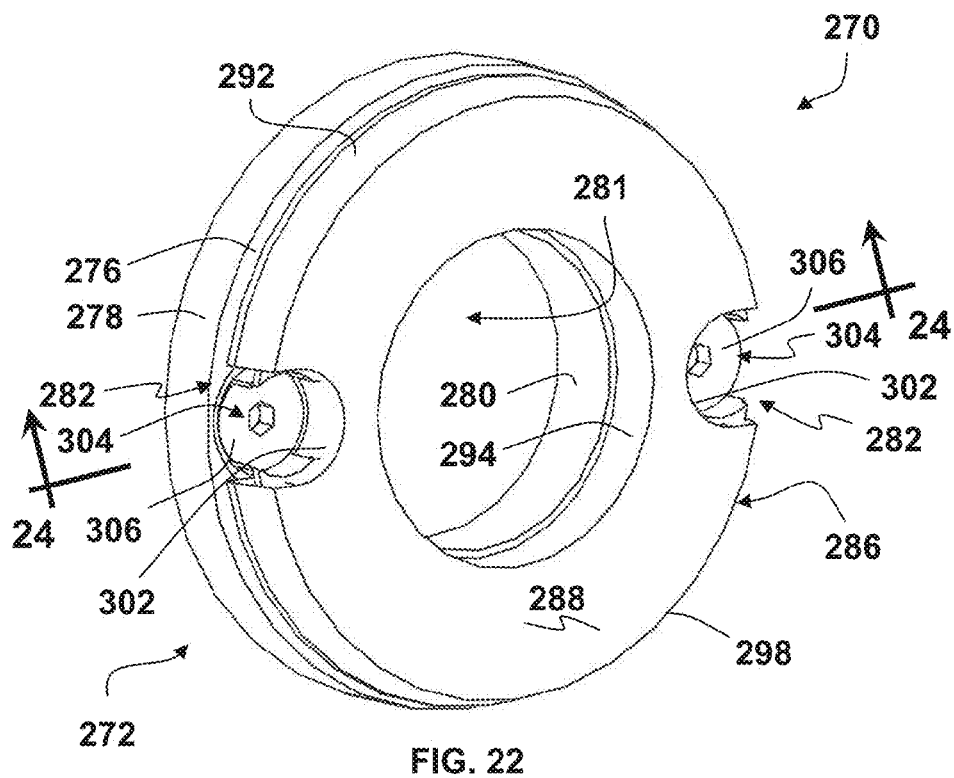
FIG. 22 shows a perspective view of another example of a locating ring constructed in accordance with the teachings of the present invention.
Figure 23:
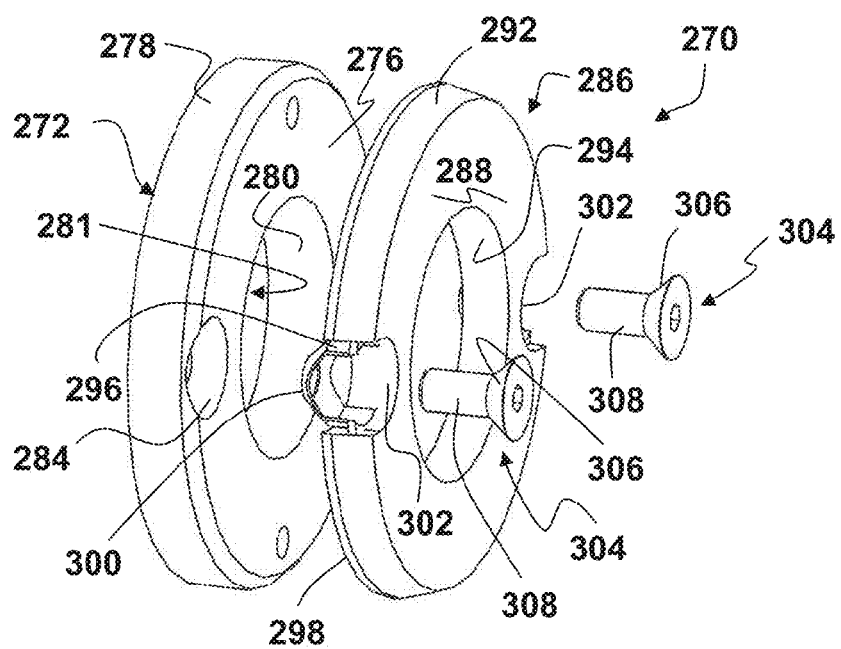
FIG. 23 shows an exploded perspective view of the locating ring in FIG. 22.
Figure 24:
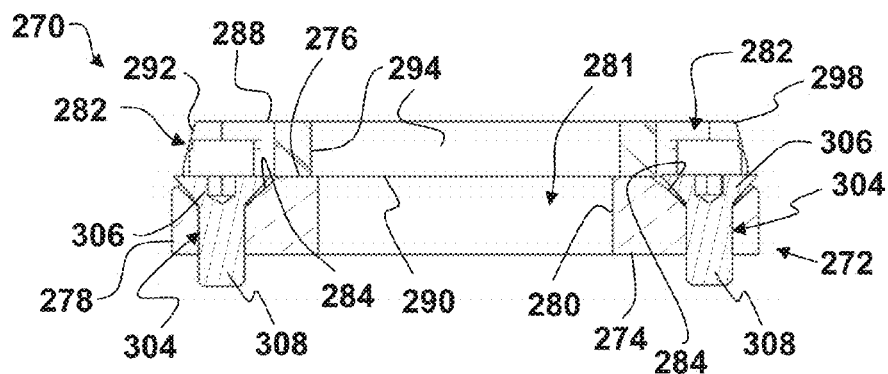
FIG. 24 shows a cross-section taken along line 24-24 of the locating ring in FIG. 22.
Figure 25:
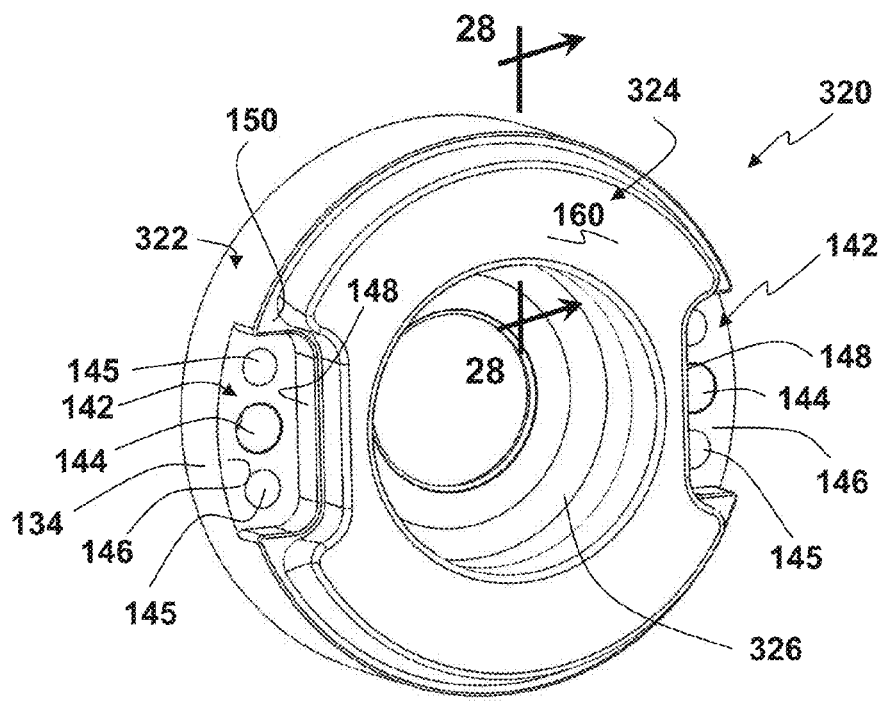
FIG. 25 shows a perspective view of another example of a locating ring constructed in accordance with the teachings of the present invention.

FIGS. 22-24 illustrate still another example of a locating ring 270 constructed in accordance with the teachings of the present invention. In this example, the locating ring 270 has a body 272 in the form of a circular annulus. The body 272 generally has a mounting face 274, an opposite locating face 276, an outer perimeter surface 278, an interior annular surface 280, and a central opening 281 through the body defined by the annular surface. The body 272 also has a plurality of fastener receptacles. One pair of the receptacles 282 in this example is diametrically opposed to one another through the body. Each of the pair of receptacles 282 has a chamfered entry 284.

The locating ring 270 in this example also has a guard 286 that is also essentially a circular annulus. The guard 286 in this example has a front face 288, an opposite rear face 290, a circumferential sidewall 292, and an inner annular wall 294. The annular wall 294 coincides with the interior annular surface 280 on the body 272 when connected to the body. In this example, the guard 286 is formed as a two-piece component including an inner rigid skeleton 296 supporting an over-molded layer 298 of the above-described a soft guard material. The inner rigid skeleton 296 can be provided to give structural integrity to the guard 286 and can be made of steel, aluminum, plastic, or other suitably rigid materials. The over-molded layer 298 is provided to provide the guard or cushioning function described herein. Exposed portions 300 of the rigid structure 296 are accessible through a pair of opposed notches 302 formed into the circumferential sidewall 292 on the guard. The exposed portions 300 in this example are configured to nest with the corresponding chamfered entries 284 in the body. Fasteners 304 having tapered heads 306 can be utilized to secure the guard 286 to the body 272. The same fasteners 304 can be utilized to also mount the locating ring 270 to a mold tool, if desired. The fasteners 304 can be provided with threaded shafts 308 that extend beyond the mounting face 274 of the body as shown in FIG. 24 when assembled and mounted to a mold tool.

The locating ring 270 can again be provided as a unique body 272 and guard 286 combination fabricated to specifically mate with one another. Alternatively, the guard 286 in this example can be provided to again retrofit an existing or conventional locating ring, if desired.

FIGS. 25-28 illustrate yet another embodiment of a locating ring 320 constructed in accordance with the teachings of the present invention. In this example, the locating ring 320 has a body 322 that is essentially identical to the body 132 of the locating ring 130 previously described herein. Thus, the body 322 utilizes the same reference numbers to represent like parts. Likewise, the locating ring 320 has a guard 324 that is substantially identical to the guard 156 of the locating ring 130 previously described herein. Again, the guard 324 utilizes the same reference numbers to represent like parts.

The central opening 140 of the body 322 is not a cylindrical structure. Instead, the inner annular wall 138 changes in diameter and is curved, becoming smaller, moving from the locating face 152 toward the mounting face 136. As is known in the art, the surface can accumulate cured material residue, such as cured injection molding material resulting from the injection molding process. Such cured residue is typically removed from the surfaces of the inner annular wall 138 and other surfaces of the body 322 using a brass tool. Cleaning of cured residue from the surfaces of the body 322 can damage the surfaces.

Figure 26:
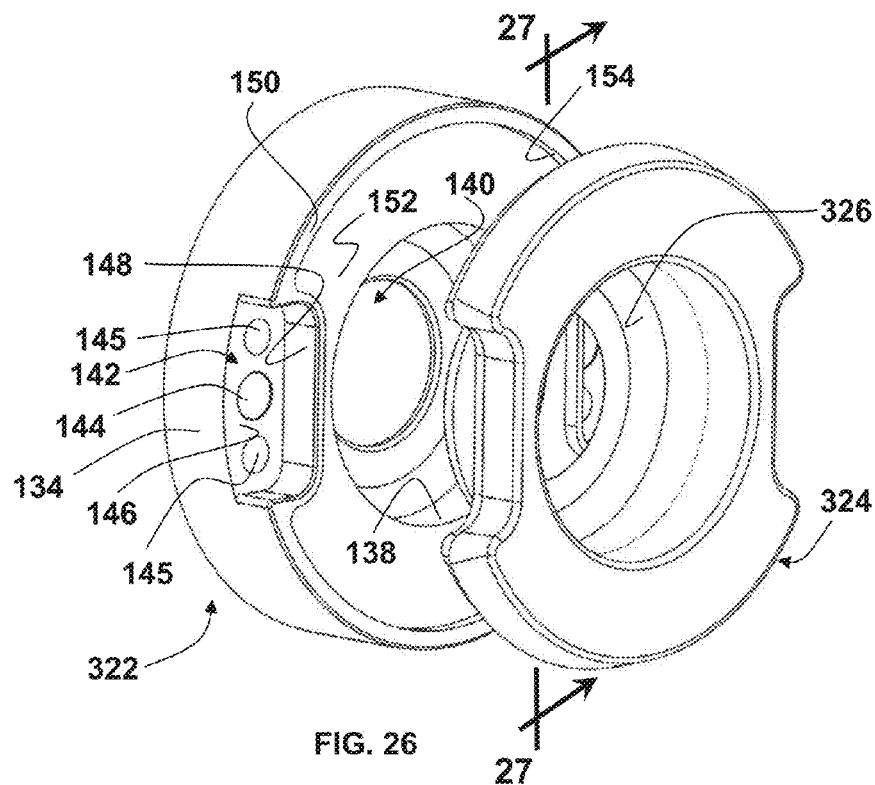
FIG. 26 shows an exploded perspective view of the locating ring in FIG. 25.
Figure 27:
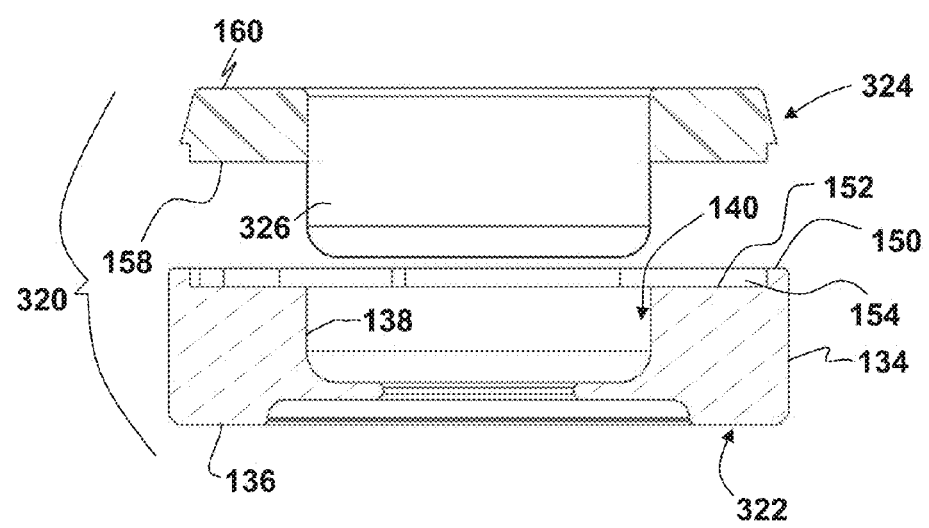
FIG. 27 shows a side view of the exploded locating ring in FIG. 26.
Figure 28:
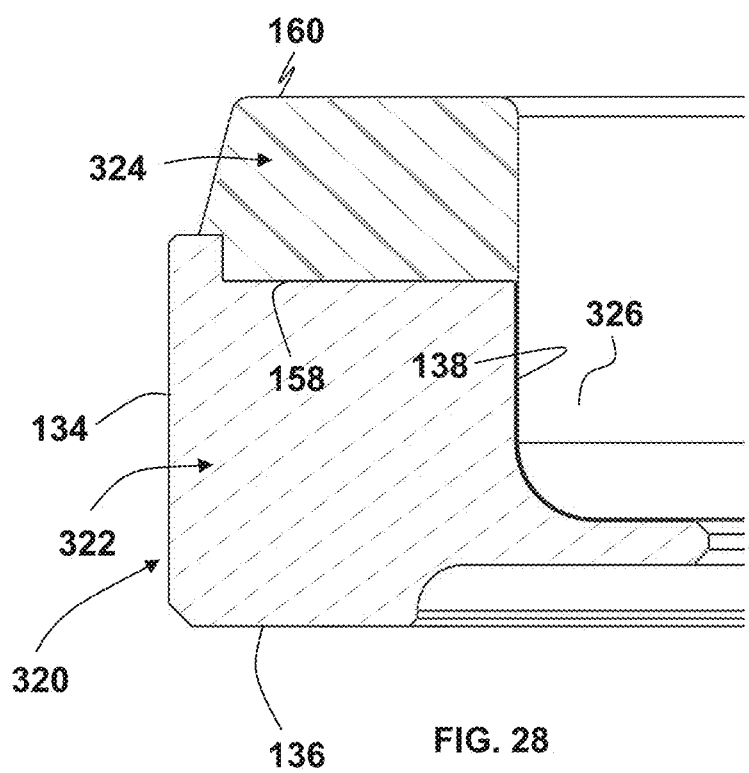
FIG. 28 shows a cross-section taken along line 28-28 of part of the locating ring in FIG. 25.

To help alleviate this problem, the guard 324 in this example is material overmolded onto the body 322 as previously described. The material utilized to form the guard 322 can have a non-stick surface characteristic. One such example of a suitable material is liquid silicone rubber. In addition, a thin skin layer 326 of the overmolded material can be formed as shown in FIGS. 26-28 on the entire inner annular wall 38 where the material of the guard 324 would otherwise not be located or formed. The thin skin layer 326 can thus be added to any surface of the body 322 were a non-stick surface characteristic is desired. If residue or mold material cures on a surface having the thin skin layer 326, the residue can easily be peeled from the surface without the use of any tool. Further, the thin skin layer 326 can protect the inner annular wall surface 138 as well.

Some molded parts can be very big and/or require relatively heavy wall thicknesses. Such parts require a large mold cavity and a high volume of resin material to make the parts. A mold tool for forming smaller and/or thin walled parts typically utilizes a small sprue bushing orifice, such as that described earlier with respect to FIGS. 4-7. The sprue bushing typically has a relatively small, fixed diameter orifice and is flush with or recessed into the surface of the mold tool. For bigger parts, the nozzle orifice must be much larger. For various reasons to those having ordinary skill in the art, the typical sprue is undesirable and is removed and replaced. A valve gate system utilizes a piston to move a stem or other device relative to the nozzle orifice to open and close the orifice. The piston is typically housed within a valve gate body that is relatively large. This results in the nozzle seat being positioned on the valve gate body instead of the mold tool.

Figure 29:
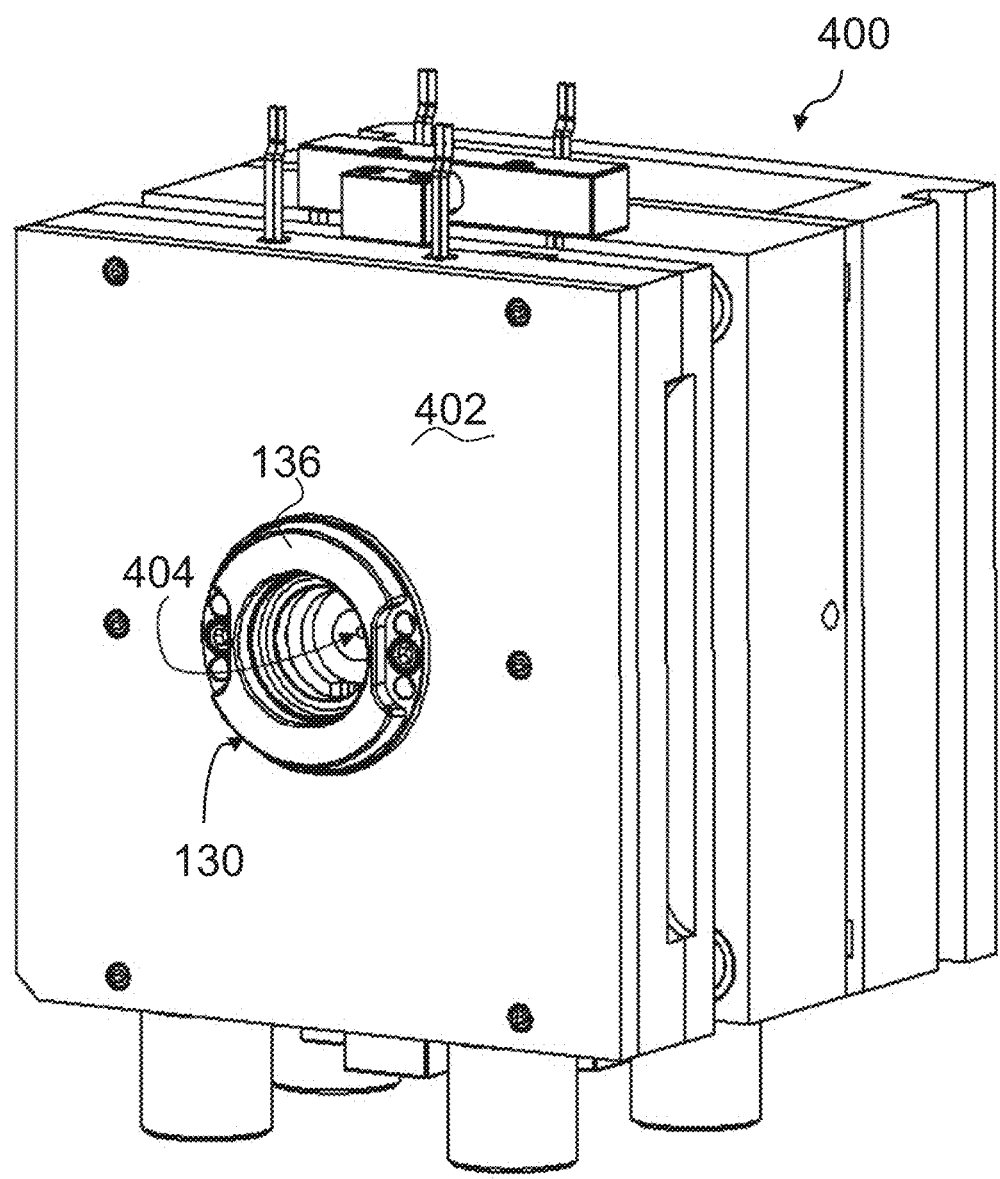
FIG. 29 shows a perspective view of another example of a mold tool constructed in accordance with the teachings of the present invention.
Figure 30:
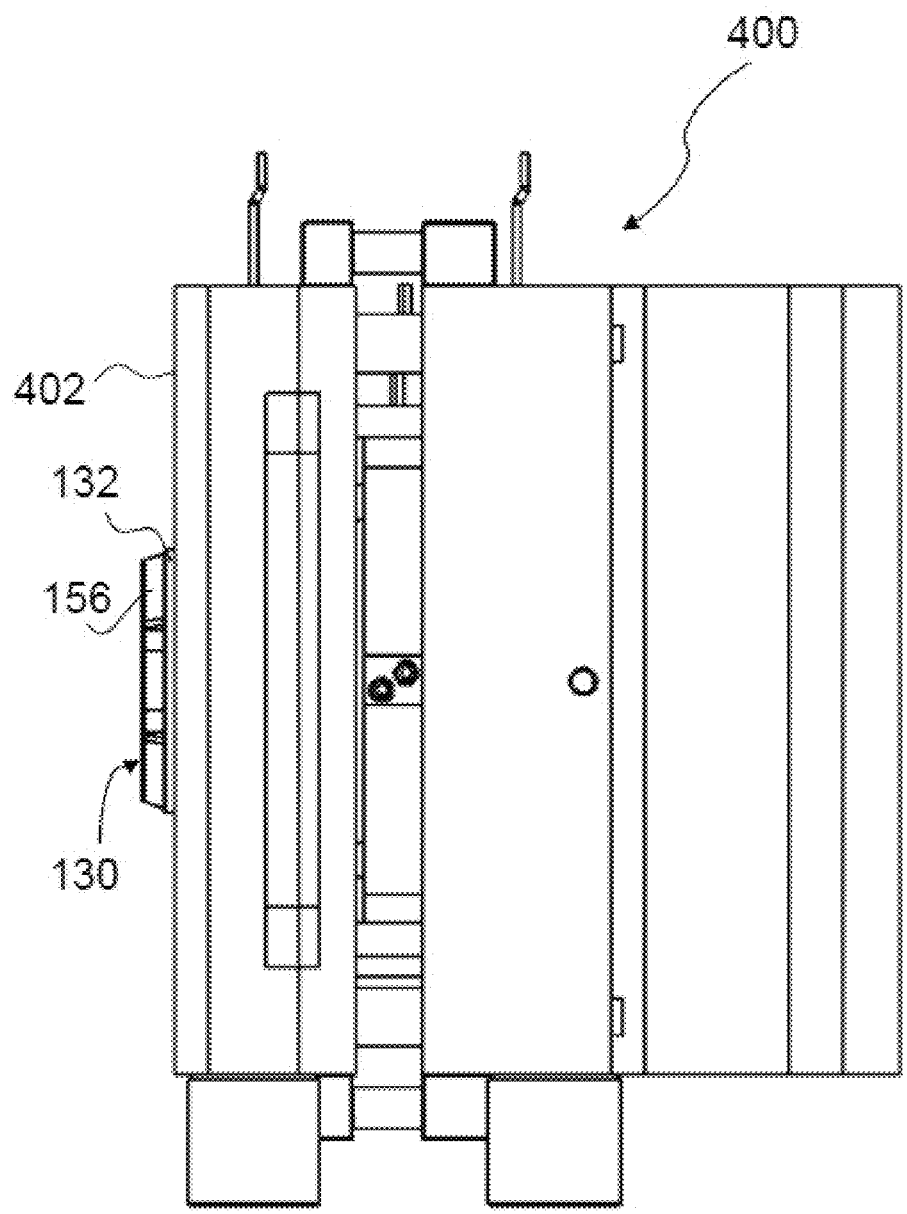
FIG. 30 shows a side view of the mold tool in FIG. 29.

With reference to FIGS. 29 and 30, a first mold part or mold tool 400 of a mold machine is illustrated. The mold tool 400 is similar to the earlier described mold tool 120 of FIGS. 4-7. In this example, the mold tool 400 has a first side with a first surface 402 that would mate against a mold platen, such as the platen 112 described earlier. A nozzle seat 404 is exposed on the first side of the mold tool 400. A locating ring 130 (see above and FIGS. 8-10) is mounted to the mold 400 and has a body 132 with a guard 156, as described above. The locator ring 130 has a ring shape with a central opening concentric with a center axis, also as described above. In this example, the nozzle seat 404 is exposed on the first surface 402 of the mold tool 400 with the sprue bushing and nozzle seat centered within the ring 130. The locating ring 130, including the guard 136, is mounted directly to the first surface 402 (or in a recess therein) of the mold tool 400, similar to the earlier described embodiment. This set up is typical of a mold tool for molding relatively small parts.

Figure 31:
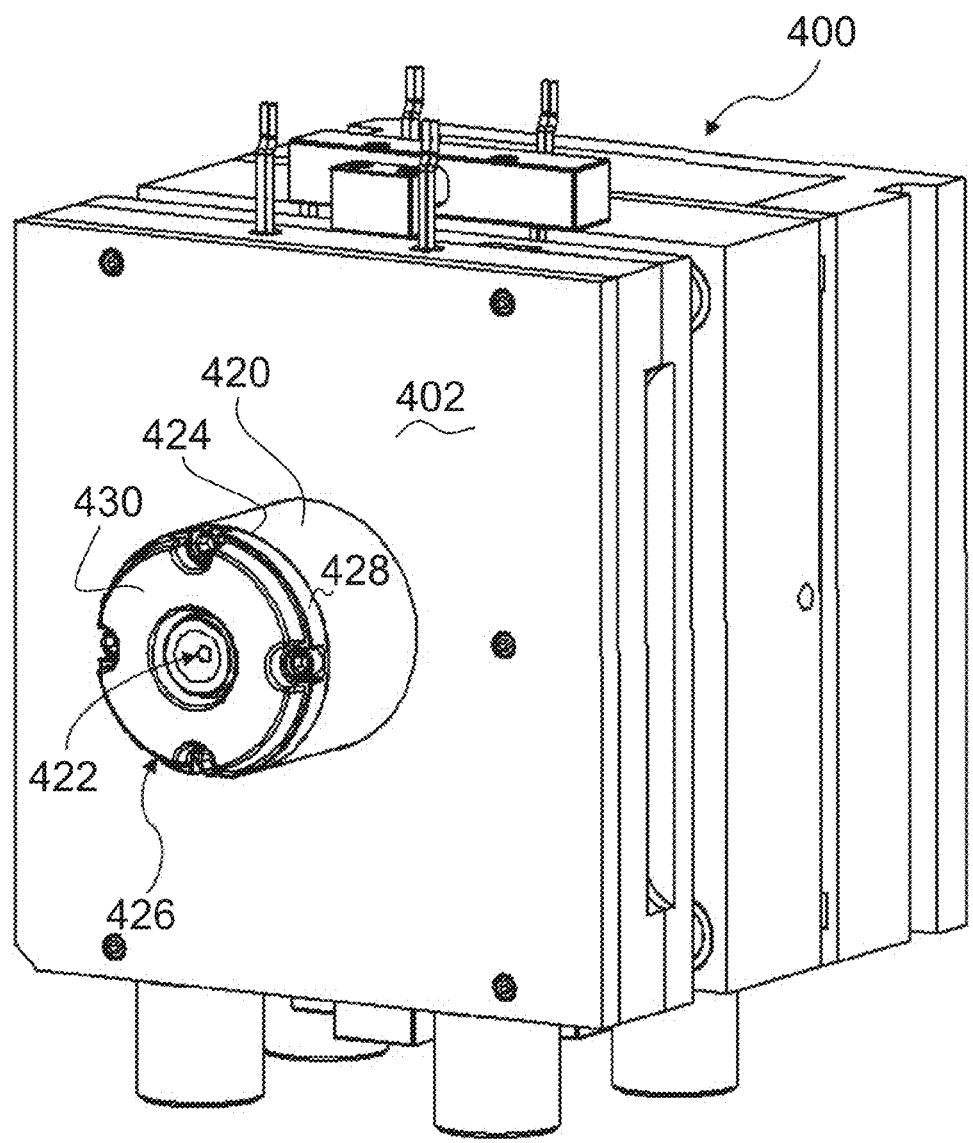
FIG. 31 shows a perspective view of another example of a mold tool constructed in accordance with the teachings of the present invention.
Figure 32:
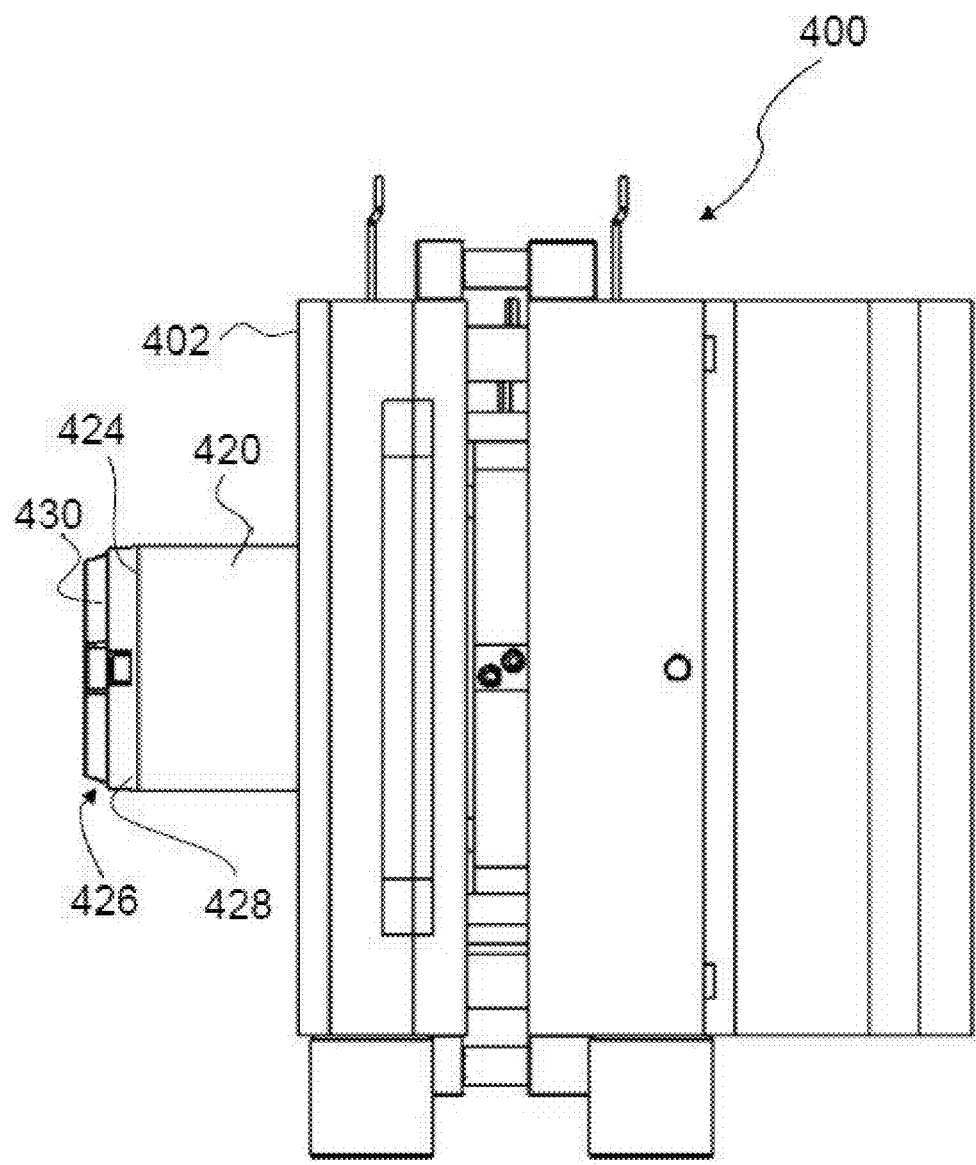
FIG. 32 shows a side view of the mold tool in FIG. 31.
Figure 33:
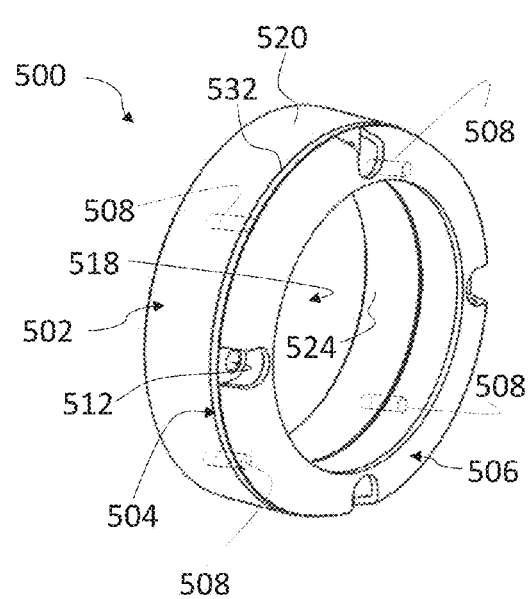
FIG. 33 shows a front perspective view of another example of a locating ring constructed in accordance with the teachings of the present invention.
Figure 34:
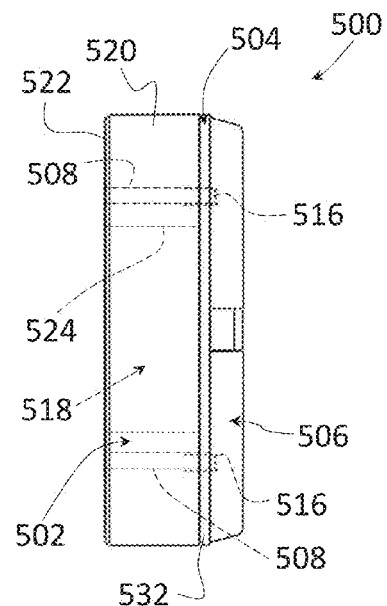
FIG. 34 shows a side view of the locating ring in FIG. 33.
Figure 35:
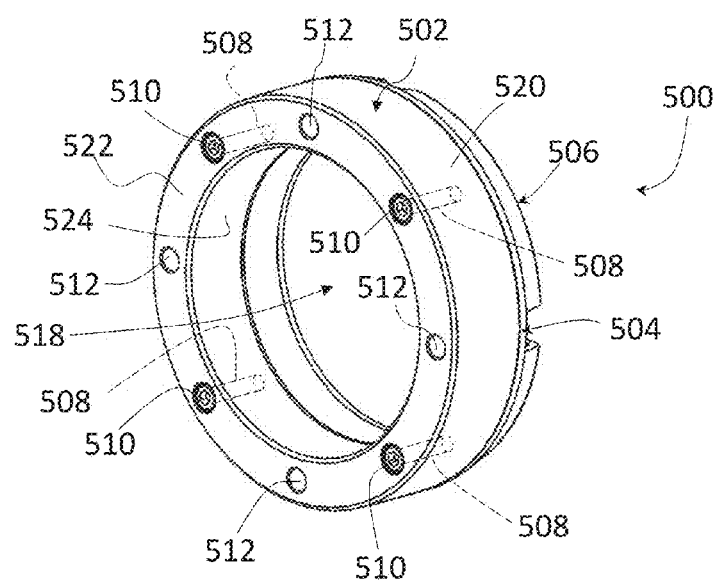
FIG. 35 shows a rear perspective view of the locating ring in FIG. 33.

With reference to FIGS. 31 and 32, the first mold part or mold tool 400 is illustrated in a configuration that is suitable for forming large and/or thick walled parts. In this example, an elongate valve gate body 420 is mounted to and protrudes from the first surface 402 on the first side of the tool 400. A nozzle seat 422 is provided on a free end 424 of the body 420. A locating ring 426 is shown in this example having another different configuration in comparison to the previously described examples. The locating ring 426 again generally has a ring-shaped body 428 with a guard 430 mounted or otherwise provided on a locating face of the ring body. A mounting face of the locating ring 426 is connected to the free end 424 of the valve gate body 420. The locating ring 426 surrounds and exposes the nozzle seat 422 and both the nozzle seat and the locating ring are spaced from the first surface 402 on the mold tool 400. In this example, the locating ring 426 protects the nozzle seat 422 from damage, as well as protects the valve gate body 420 and surfaces of a mold platen that might otherwise contact the free end 424 of the valve gate body during alignment of the mold tool 400 in a mold machine.

Figure 36:
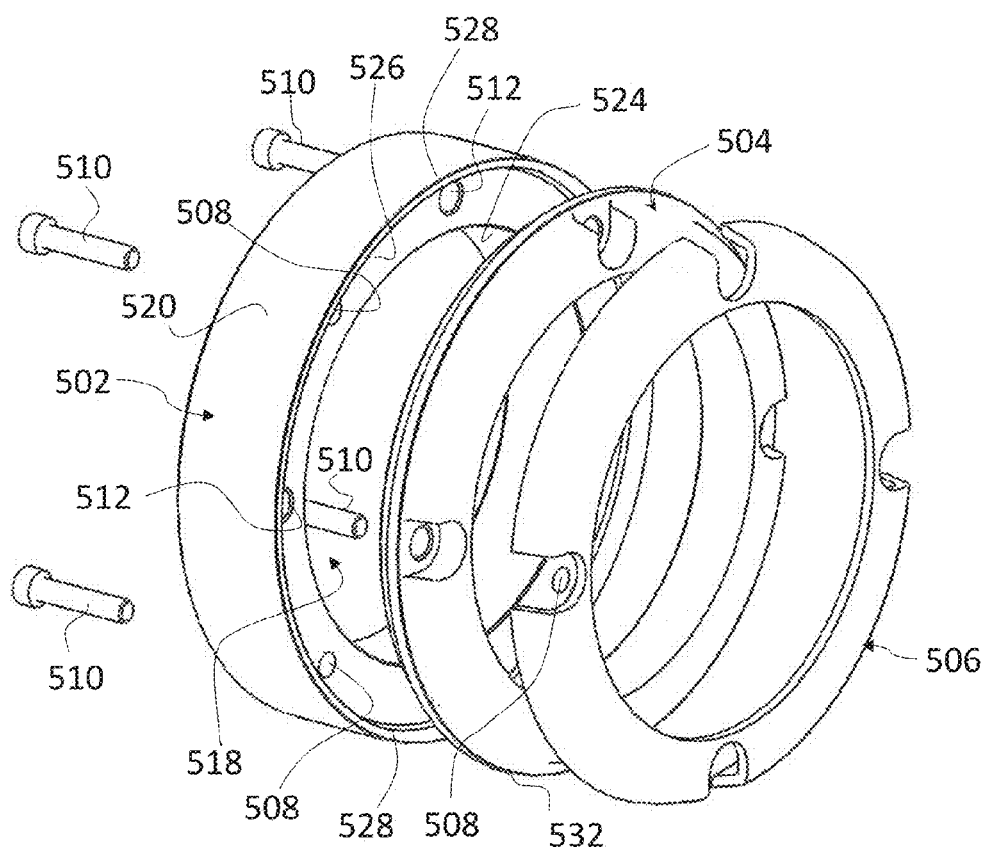
FIG. 36 shows a front perspective and exploded view of the locating ring in FIG. 33.
Figure 37:
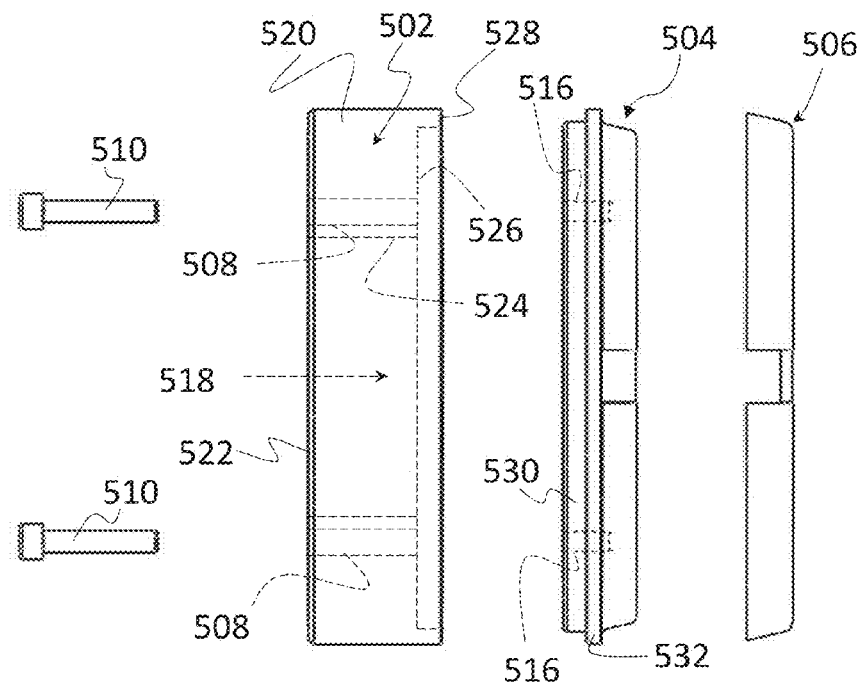
FIG. 37 shows a side exploded view of the locating ring shown in FIGS. 33 and 36.
Figure 38:
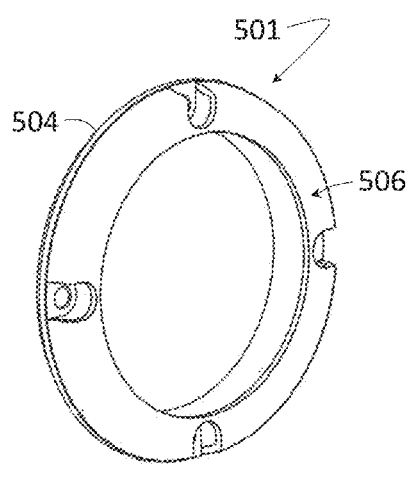
FIG. 38 shows a front perspective view of another example of a locating ring constructed in accordance with the teachings of the present invention.
Figure 39:
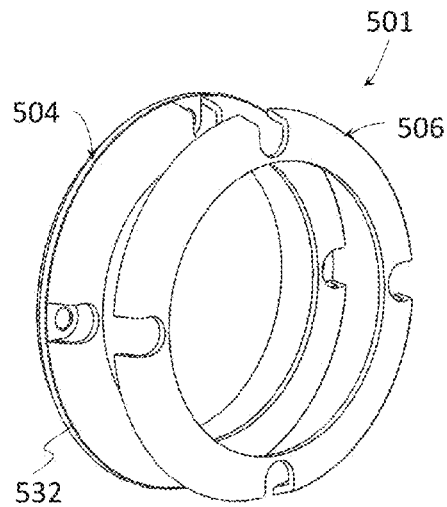
FIG. 39 shows an exploded view of the locating ring in FIG. 38.

Some molding equipment have extremely large tools and thus use or require extremely large locating rings. The rings can be quite expensive to purchase and require a substantial investment by the end user. Therefore it may be quite beneficial to provide a locating ring of the type disclosed herein that can be used to retrofit an existing all steel ring in order to minimize the financial investment required to achieve the benefits of the disclosed locating rings. FIGS. 33-37 show another example of a locating ring 500 constructed in accordance with the teachings of the present invention. In this example, the locating ring 500 can be an assembly configured as an entire locating ring unit or as a locating ring subassembly 501 as depicted in FIGS. 38 and 39 configured to retrofit an existing steel or metal locating ring.

The locating ring 500 is shown as a complete assembly in FIGS. 33-37 and as having a ring base 502, a body or cap piece 504 that attaches to the steel ring base, and a guard 506 over the cap piece. As noted above, the entire locating ring 500 can be provided as a complete assembly as shown in FIGS. 33-37 or only the cap piece 504 and guard 506 can be provided as a retrofit sub-unit or locating ring subassembly 501 as shown in FIGS. 38 and 39 for retrofitting an existing steel base (similar to the ring base 502) that is already in use by the end user. The ring base 502 of the assembly 500 can be formed of steel or another durable and substantial material. The cap piece 504 can be formed of aluminum or another suitable durable material. In one example, the cap piece 504 can be formed of aluminum or another suitable durable material. In one example, the guard 506 can be formed of silicone, rubber, or other suitable material, similar to the earlier described embodiments of the bumper or guard. In another example, the cap piece and guard can be an integral one-piece construction that is coupled to the steel locating ring or ring base. Such a component can be formed of a material, which should be softer than steel or at least softer than the material of the molding equipment, in order to reduce potential damage to the molding equipment when setting the mold. For example, such a component could be fabricated from aluminum, bronze, plastic, composite, rubber, silicone, or the like. This type of component could be adhered, fastened, or otherwise bonded to the locating ring or ring base.

The ring base 502 in this example has a plurality of attachment holes 508 provided to receive fasteners 510 for securing the cap piece 504 to the ring base. As with the earlier described embodiments, the ring base 502 can also have a plurality of mounting holes 512 for mounting the locating ring 500 to a tool. The ring base 502 can also have a plurality of jack screw holes (not shown) that can assist in releasing and removing the locating ring 500 from a tool as needed. The cap piece 504 also has a plurality of threaded holes 516, the number of which can coincide with the number of attachment holes 508. The fasteners can be used to mount and secure the cap piece 504 to the ring base 502. If the locating ring 500 is provided as an assembly, the ring base can be prefabricated with the various holes, including the attachment holes 508. If an existing locating ring is being retrofit, the existing locating ring can be modified on site to add at least the attachment holes 508. A pattern for forming the attachment holes and/or instructions to do so can be provided to the end user with the sub-assembly 501, i.e., the cap piece 504 and guard 506 to properly modify the existing locating ring to receive the retrofit part.

Again, the ring base 502 is shown as an annulus or having a ring shape with a center opening 518, an outer perimeter surface 520, a mounting face 522, and an annular inner wall 524 forming the center opening 518. The ring base 502 also has a locating face 526 opposite the mounting face 522. The locating face 526 can be a flat planar surface, can have a groove formed into the face of the ring base, or, as shown, can be recessed and surrounded only by a short rim or lip 528 protruding axially at the outer perimeter of the ring base and beyond the locating face 526 as depicted in FIG. 36. The cap piece 504 can have a diameter that is sized to mate against a flat locating face, seat within a groove in the locating face, or fit entirely within the rim or lip 528 forming the recess. Alternatively, as shown in FIGS. 36 and 37, the perimeter of the cap piece 504 can have a stepped down portion 530 formed for example by or adjacent a radially extending flange 532. The stepped down portion 530 can be seated in the recess in the ring base 502 and contact the locating face 526. The flange 532 can bear against the edge of the rim or lip 528. In this example, the fasteners can be inserted through the attaching holes 508 in the ring base 502 and can be screwed into the threaded holes 516 in the cap piece 504 to assemble the locating ring 500.

If provided as an assembly, and in an alternate example, the fasteners 510, attachment holes 508, and threaded holes 516 can be eliminated, if desired. The cap piece can instead be interferingly fit into the recessed locating face 526 or into a groove of the ring base 502. The cap piece can be made from aluminum, as noted above, to reduce weight and for easy machining. An aluminum cap piece would also have greater thermal expansion characteristics compared to a steel ring base. The aluminum cap piece could be cryogenically frozen for assembly in order to shrink the diameter of the cap piece. The very cold cap piece can then be place into the groove or recess of the locating face on the ring base. As the aluminum cap piece warms up it would expand to create an interference fit with the steel ring base. The radial outside surface geometry of the aluminum cap piece and the mating radial inside surface of the steel ring base can each be formed having a slight taper angle. The angle can be oriented on each piece such that the aluminum cap piece interlocks into place within the groove or recess wall of the steel ring base once it expands.

Figure 41:
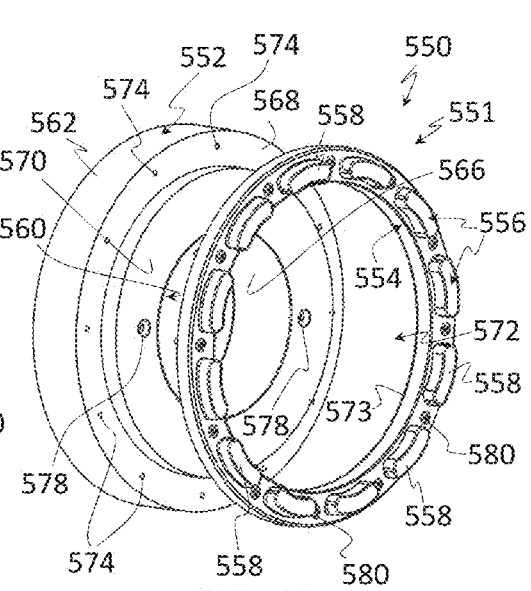
FIG. 41 shows a partially exploded view of the locating ring in FIG. 38.

The material of the guard 506 can be molded onto or otherwise adhered to the cap piece 504 to form the subassembly 501 so that no end user assembly of the guard and cap piece is required. If the cap piece 504 and guard 506 are provided as a subassembly 501 for retrofitting a conventional locating ring, the cap piece and guard can be prefabricated and provided to the end user ready to install. It is possible, however, that the guard and the cap piece can be provided as separate parts, which are assembled by the manufacturer or by the end user during installation or retrofit, as depicted in FIG. 41 as the subassembly 551 described below. Where an end user is to retrofit their existing locating ring, the end user can machine the existing parts to receive a subassembly that carries or provides the guard or implements the guard function. This would allow for fastener locations and internal ring geometry variations to be backwards compatible for any existing locating ring of similar diameter.

Figure 40:
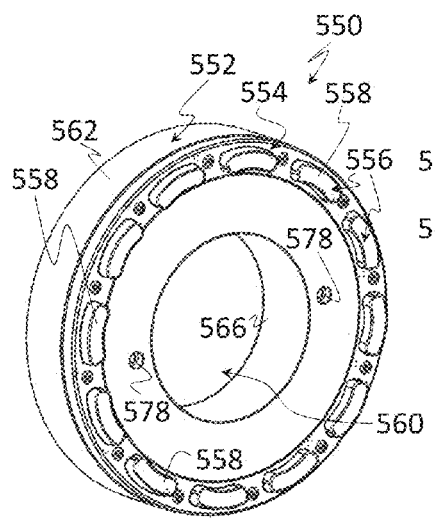
FIG. 40 shows a front perspective view of another example of a locating ring constructed in accordance with the teachings of the present invention.
Figure 42:
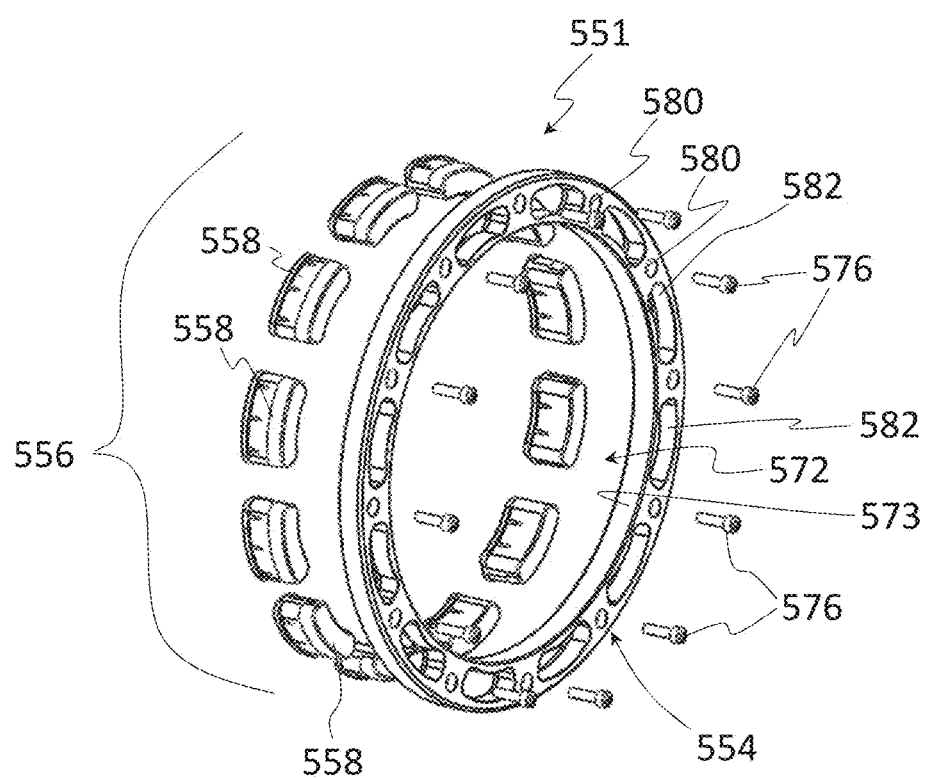
FIG. 42 shows an exploded view of a portion of the locating ring in FIG. 41.

FIGS. 40-42 show another example of a locating ring 550 that can be provided as either an assembly, as in FIG. 40, or as a subassembly 551, as represented in FIGS. 41 and 42, for use in retrofitting an existing steel locating ring (as represented in FIG. 41). In this example, the locating ring 550 is a complete assembly in FIG. 40. The locating ring is a subassembly 551 for retrofitting an existing steel locating ring in FIGS. 41 and 42. In this example, the locating ring has a ring base 552, a body or cap piece 554 that attaches to the steel ring base, and a guard 556 formed of a plurality of discrete guard or bumper segments 558, similar to the first embodiment of the locating ring 50 described above. The ring base 552 of the assembly 550 can be a solid disc shaped body or an annulus or ring shape as shown. The ring base 552 can be formed of steel or another durable and substantial material. The cap piece 554 can be formed of aluminum or another suitable durable material. The segments 558 of the guard 556 can be formed of thermoplastic elastomer, thermoplastic rubber, thermoplastic resins of any type, thermoset elastomers, thermoset rubber, silicone, or thermoset resins of any type, similar to the above described embodiments of the bumper or guard and can be configured and installed similar to the segments 80 as described above.

The ring base 552 can again be an annulus or ring shape with a center opening 560, an outer perimeter surface 562, a mounting face (on the back side not shown), and an annular inner wall 566 forming the center opening 560. The ring base 552 also has a locating face 568 opposite the mounting face 564. The locating face 568 can be a flat planar surface, can have a groove formed into the face of the ring base, or, as shown, can be recessed and surround a centering protrusion 570 that protrudes axially from the inner perimeter of the ring base 552 around the center opening 560 and axially beyond the locating face 568 as depicted in FIG. 41. The cap piece 554 can simply mate against a flat locating face on the ring base, seat within a groove in the locating face, or fit within a raised lip or rim as in the prior described embodiment. Alternatively, as shown in FIGS. 40 and 41, a central opening 572 can be defined by an inner facing wall 573 of the annular cap piece 554. The inner facing wall 573 can seat around the centering protrusion 570 of the ring base 552 and the cap piece 554 can lie against the recessed locating face 568.

In this example, the ring base 552 can have a plurality of threaded holes 574 through or at least into the locating face 568 of the base. As with the earlier described embodiments, the ring base 552 can also have a plurality of mounting holes 578 for mounting the locating ring 550 to a tool. The ring base 552 can also have a plurality of jack screw holes (not shown). The cap piece 554 also has a plurality of fastener holes 580, the number of which can coincide with the number of threaded holes 574 in the ring base 552. Threaded fasteners 576 can be used for securing the cap piece 554 to the ring base. The fasteners 576 (see FIG. 42) can be used to mount and secure the cap piece 554 to the ring base 552 (see FIGS. 40 and 41) through the holes 580 and threaded holes 574. If the locating ring 550 is provided as an assembly, the ring base 552 can be prefabricated with the various holes, including the threaded holes 574. If an existing locating ring is being retrofit, the locating ring can be modified to add at least the threaded holes 574. Again, a pattern for forming the holes and/or instructions to do so can be provided to the end user along with the cap piece 554 and bumper segments 558 to properly modify the existing locating ring to receive the retrofit parts.

As shown in FIGS. 41 and 42, the bumper segments 558 can be inserted through bumper holes 582 formed through the body or cap piece 554. The guard 556 and bumper segments 558 can be formed and installed in the same manner as described above for the first locating ring 50 embodiment. The bumper segments can be individual parts captured between the cap piece 554 and ring base 552 when assembled. Alternatively, the bumper segments can be carried on or integrally molded with an integral ring of like material to be captured between the base and cap piece when assembled.

Numerous examples and alternate embodiments of locating rings have been disclosed and described herein. Each of these embodiments is provided to represent possible variations and alternate configurations of such locating rings. The locating rings disclosed and described herein, however, can vary considerably and still fall within the spirit and scope of the present invention. The particular shape and configuration of both the bodies and guards can be varied from the examples shown and yet perform and function as intended. Also, the locating rings disclosed herein are described for use in an injection molding process and machine. However, the locating rings may also be suitable in other manufacturing processes and machines that require relative location of parts without damage to the underlying components. One such example would be a die casting operation.

Although certain locating rings and methods of use have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A method of aligning parts of a molding machine, the method comprising the steps of:
    obtaining a locating ring having a metal body and a guard formed of a material softer than the metal of the body, the metal body having a ring shape, a perimeter surface facing radially outward, a center axis, a mounting face, and a locating face opposite the mounting face, the guard connected to the body radially within the perimeter surface and projecting axially beyond the locating face;
    mounting the locating ring to a first side of a first mold part, the first mold part having a first surface on the first side;
    arranging a second mold part and the first mold part in proximity to one another, the second mold part having a second surface with a locating hole therein;
    moving the first and second surfaces of the first and second mold parts toward one another until the guard contacts the second surface or enters the locating hole;
    repositioning the first and second mold parts relative to one another as needed until the guard and the perimeter wall align with the locating hole; and
    further moving the first and second mold parts toward one another until the locating ring seats in the locating hole and the first and second surfaces engage one another.

2. A method according to claim 1, wherein the first mold part is a movably suspended injection mold and the second mold part is a stationary machine platen, and wherein the steps of moving and further moving include moving the injection mold relative to the stationary machine platen.

3. A method according to claim 1, wherein the step of mounting further comprises mounting the mounting face of the locating ring directly to the first surface of the first mold part.

4. A method according to claim 1, wherein the step of mounting further comprises mounting the mounting face of the locating ring to a free end of a valve gate body protruding from the first surface.

5. A method according to claim 1, wherein the step of mounting further includes mounting the locating ring to surround a nozzle exposed on the first side of the first mold part while exposing part of the nozzle.

6. A method according to claim 5, wherein the step of mounting further includes the nozzle being exposed on the first surface of the first side and includes the mounting face of the locating ring being mounted directly to the first surface.

7. A method according to claim 1, wherein the step of mounting further includes an elongate valve gate body protruding from the first surface of the first mold part, wherein the nozzle is located at a free end of the valve gate body spaced from the first surface, and wherein the mounting face of the locating ring is mounted to the free end of the valve gate body.

8. A method according to claim 1, wherein the step of obtaining further includes the guard of the locating ring being formed of a non-metal material or a non-ferrous metal material.

9. A method according to claim 1, wherein the step of obtaining further includes the body of the locating ring being formed of a steel material.

10. A method according to claim 1, wherein the step of obtaining further includes the guard of the locating ring being formed of a liquid silicone rubber, aluminum, bronze, brass, thermoplastic elastomer, thermoplastic rubber, thermoset elastomer, or thermoset rubber.

11. A method according to claim 1, wherein the step of obtaining further includes the body of the locating ring having a plurality of through bores formed axially through the body, and further includes the guard having a plurality of bumper segments, one bumper segment protruding through each of the through bores.

12. A method according to claim 11, wherein the step of obtaining further includes each of the bumper segments having a back end aligned flush with the mounting face of the body and a front end protruding beyond the locating face of the body.

13. A method according to claim 1, wherein the step of obtaining further includes the locating face of the body of the locating ring having a recess thereon, and further includes the guard being bonded to the locating face within the recess.

14. A method according to claim 1, wherein step of obtaining further includes the guard of the locating ring being formed of a translucent, semi-transparent, or transparent material, and further includes an insert being positioned against the locating face of the body beneath the guard, wherein the insert has indicia visible through the guard.

15. A method according to claim 1, wherein the step of obtaining further includes the body of the locating ring having a central opening concentric with the axis defined by an inner annular wall of the body.

16. A method according to claim 1, wherein the step of obtaining further includes a skin layer of the guard material being formed integral with the guard and covering the surface of the inner annular wall.

17. A method according to claim 1, wherein the step of obtaining further includes a surface or surface portion of the guard having a non-stick surface characteristic.

18. A method according to claim 1, wherein the step of obtaining further includes the guard of the locating ring being removably connected to the body by being magnetically connected to the body, by being a removable plug insertable into a central opening in the body, or by being fastened to the body, or includes the guard of the locating ring being bonded to the locating face of the body.

19. A method according to claim 1, further comprising the steps of:
identifying an existing locating ring to be retrofit, the existing locating ring having a body made of metal, the body including a perimeter wall, a mounting face, and an opposite locating face;
selecting a guard configured to connect to the body of the locating ring and made of a material softer than the metal of the body; and
connecting the guard to the body so that part of the guard protrudes axially beyond the locating face and is radially within the perimeter wall to retrofit the existing locating ring to a retrofit locating ring,
wherein the step of obtaining includes obtaining the retrofit locating ring and wherein the step of mounting includes mounting the retrofit locating ring.

20. A method according to claim 19, further comprising the step of removing a worn, damaged, or used guard from the existing locating ring, and wherein the step of selecting includes selecting a new or replacement guard configured to connect to the body and wherein the step of connecting includes connecting the new or replacement guard to the body.

* * * * *